United States Patent
Terayama et al.

(10) Patent No.: US 9,575,798 B2
(45) Date of Patent: Feb. 21, 2017

(54) METHOD OF MANAGING TENANT NETWORK CONFIGURATION IN ENVIRONMENT WHERE VIRTUAL SERVER AND NON-VIRTUAL SERVER COEXIST

(71) Applicant: Hitachi, Ltd., Tokyo (JP)

(72) Inventors: Atsumi Terayama, Tokyo (JP); Toshio Otani, Tokyo (JP); Akihisa Nagami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 8 days.

(21) Appl. No.: 14/766,228

(22) PCT Filed: Feb. 25, 2013

(86) PCT No.: PCT/JP2013/054655
§ 371 (c)(1),
(2) Date: Aug. 6, 2015

(87) PCT Pub. No.: WO2014/128948
PCT Pub. Date: Aug. 28, 2014

(65) Prior Publication Data
US 2015/0363221 A1    Dec. 17, 2015

(51) Int. Cl.
*G06F 9/455* (2006.01)
*H04L 12/46* (2006.01)

(52) U.S. Cl.
CPC ....... *G06F 9/45558* (2013.01); *H04L 12/4641* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| 2005/0198303 | A1* | 9/2005 | Knauerhase | .......... G06F 9/5055 |
| | | | | 709/227 |
| 2010/0115101 | A1* | 5/2010 | Lain | ........................ H04L 45/02 |
| | | | | 709/227 |

(Continued)

FOREIGN PATENT DOCUMENTS

| JP | 2003-023444 A | 1/2003 |
| JP | 2012-182605 A | 9/2012 |

OTHER PUBLICATIONS

Jiang, Xuxian, and Dongyan Xu. "Soda: A service-on-demand architecture for application service hosting utility platforms." High Performance Distributed Computing, 2003. Proceedings. 12th IEEE International Symposium on. IEEE, 2003.*

(Continued)

*Primary Examiner* — Emerson Puente
*Assistant Examiner* — Charlie Sun
(74) *Attorney, Agent, or Firm* — Mattingly & Malur, PC

(57) ABSTRACT

A non-virtual server and a virtual server make up the same tenant in an environment, in which virtual servers created by dividing a single physical server into a plurality of computer environments coexist with a non-virtual server that directly uses a single physical server as a computer environment without using server virtualization. A management computer is provided with virtual switch management information that shows a correlation between the virtual servers and an internal network to which a relevant virtual server connects, and physical switch management information that shows a correlation between the non-virtual server and an internal network to which the non-virtual server connects. The management computer creates a virtual server that belongs to the same tenant as a physical instance, identifies a first internal network to which the non-virtual server connects, (Continued)

and configures the tenant so that the relevant virtual server is connected to the first internal network.

15 Claims, 15 Drawing Sheets

(56) References Cited

U.S. PATENT DOCUMENTS

| | | | | |
|---|---|---|---|---|
| 2010/0223397 A1* | 9/2010 | Elzur | ............. | H04L 41/0213 709/235 |
| 2011/0283017 A1* | 11/2011 | Alkhatib | ............. | H04L 12/4641 709/244 |
| 2014/0244847 A1* | 8/2014 | Pouyllau | ............. | H04L 47/70 709/226 |

OTHER PUBLICATIONS

International Search Report of PCT/JP2013/054655.

\* cited by examiner

Physical switch VLAN ID management table

| Host ID | Switch ID | Port ID | Port attribute | VLAN ID |
|---------|-----------|---------|----------------|---------|
| A04 | SW01 | #01 | Access | 1 |
| A22 | SW01 | #03 | Trunk | 1,10 |
| SW03 | SW01 | #10 | Trunk | 10 |
| ... | | | | ... |

Fig. 5(a)

Virtual switch VLAN ID management table

| Instance ID | Switch ID | Port ID | VLAN ID |
|-------------|-----------|---------|---------|
| C01 | SW100 | #1 | 1 |
| K00 | SW100 | #2 | 10 |
| A20 | SW101 | #1 | 10 |
| ... | | | ... |

Fig. 5(b)

METHOD OF MANAGING TENANT NETWORK CONFIGURATION IN ENVIRONMENT WHERE VIRTUAL SERVER AND NON-VIRTUAL SERVER COEXIST

TECHNICAL FIELD

The present invention relates to a computer system in general, and more specifically to a method and an apparatus for managing the configuration of resource including, first of all, a network on a computer system comprising a mixture of virtual and physical servers.

BACKGROUND ART

Server virtualization techniques are popular, and the integration of a plurality of virtual servers onto a single piece of hardware (a single physical server) to construct a corporate information system has become the norm. In accordance with server virtualization techniques, the physical resources of a physical server (CPU, memory, and so forth), which conventionally had been associated on a one-to-one basis with the physical server, can be divided into a plurality of server resources and effectively utilized by independently running a virtual server for each server resource. In addition, by flexibly changing the amount of physical resources allocated to a virtual server, and transferring the virtual server to another physical server (a physical server that has virtualization functions and can run a plurality of virtual servers, such a physical server being referred to hereinbelow as a "virtual server host"), it is possible to distribute resources to meet demand for service provided by application on a virtual server. However, because the virtual server is sharing the resources provided by a single virtual server host, performance is affected by the other virtual servers on the same virtual server host.

Accordingly, an operation method that utilizes, without any modification, a physical server that does not have a hypervisor (software having functions for running a plurality of virtual servers on a single physical server) as a processing environment is conceivable even in an environment where a virtual server exists. A physical server that does not have a hypervisor monopolizes the physical resources possessed by a single hardware apparatus (the physical server), and therefore can make the most of the processing performance, and moreover, can be operated stably without receiving any influence from other servers. These physical servers will be called non-virtual servers, or bare metal servers herein. Although a non-virtual server has advantages from the standpoint of performance as mentioned above, it lacks flexibility of system construction compared to the virtual server host, which is capable of running a plurality of virtual servers. Meanwhile, cloud computing has been flourishing as a recent trend. The cloud reduces operational and management costs and meets increasing dependence on information systems by aggregating and integratively managing a large number of servers in the cloud on a platform using virtualization. A characteristic feature of the cloud is that it reinforces multi-tenant user management.

A tenant associates resources and/or a service menu provided by the cloud to each specific user group and/or organization. A plurality of tenants share one cloud infrastructure, thereby making it possible to increase the utilization efficiency of the entire platform. A mechanism for safeguarding security is essential so that an illegally access to the resources of a tenant by another tenant is inhibited. In an ordinary cloud system, security is ensured for each tenant by user authentication and network segmentation. A management apparatus for configuring network policy is disposed on the network, and controls the authorization/non-authorization of communications between servers in accordance with the tenants, users, and virtual server applications. A network configuration management apparatus like this must be capable of being flexibly created and changed in accordance with tenant and virtual server demands, and is realized as a virtual server called a network appliance.

Another requirement from the standpoint of performance is a mechanism that ensures stable operation without being affected by the operating state of a business system operating on another tenant. It is common to try to realize stable operations in a virtual server environment using load balancing that makes use of online virtual server migration, and by prioritizing control of the communications of each virtual server.

As described hereinabove, in an environment that aggregates a large number of tenants on a single platform, resource utilization efficiency increases, but guaranteeing processing performance becomes a problem. The practical application of a non-virtual server is one solution for obtaining stable computer processing performance, but it is essential that there be ideas for increasing disk I/O performance and network performance similarly. In addition, a resource configuration that covers these diverse items must be capable of changing as appropriate in line with the state of usage of the entire platform, which changes from moment to moment.

For example, PTL 1 discloses a router configuration method and system for distributing a communication load over a network. In accordance with this system, it is possible to utilize a plurality of network routes in parallel, and to make effective and practical use of network resources. PTL 2 discloses a method of efficiently managing the configuration in a multi-tenant environment.

CITATION LIST

Patent Literature

[PTL 1]
Japanese Patent Application Publication No. 2003-23444
[PTL 2]
Japanese Patent Application Publication No. 2012-182605

SUMMARY OF INVENTION

Technical Problem

The prior art does not disclose a technology that provides a network resource management method in a case where a non-virtual server and a virtual server that runs on a virtual server host coexist in the same tenant. This is because in the past the very concept of connecting a non-virtual server to the same tenant network as one configured from virtual servers for the purpose of stabilizing performance for a portion of a workload did not exist.

An object of the present invention is to construct an information system in which performance and costs are optimized in accordance with user requirements while operating a non-virtual server and a virtual server on the same tenant and ensuring independence from the perspectives of security and performance.

Solution to Problem

A management computer is connected to: a first physical server on which a virtual switch that controls a plurality of virtual instances (virtual servers) and a network between these virtual instances are operated; a second physical server on which a physical instance runs; and a physical switch to which the first physical server and the second physical server are connected, and which controls a network between the first physical server and the second physical server. The management computer comprises virtual switch management information that shows a correlation between each of the plurality of virtual instances and an internal network to which the virtual instances connect, and physical switch management information that shows a correlation between the physical instances and an internal network to which the physical instances connect. The management computer, upon receiving a first instance creation request for creating a first virtual instance that connects to the same internal network as the physical instance, creates the first virtual instance on the first physical server, refers to the physical switch management information, identifies a first internal network to which the physical instance connects, and configures the virtual switch and the physical switch so that the first virtual instance connects to the first internal network.

Advantageous Effects of Invention

According to the present invention, it is possible to operate a plurality of tenants on the same physical hardware while providing each user with a secure tenant. It is also possible to construct an information system in which performance and costs are optimized in accordance with user requirements while operating a non-virtual server and a virtual server on the same tenant and ensuring independence from the perspectives of security and performance. By making practical use of the non-virtual server on the same tenant as the virtual server, processes with low performance requirements can be properly aggregated in a small number of physical apparatuses using server virtualization, and processes with high performance requirements can be stably operated using the non-virtual server in accordance with the processing requirements at the time for a large number of business systems being used by users while ensuring the security of other tenants. That is, it is possible to change the resource configuration in accordance with the life cycle of a server-run application, and to construct an optimal information system overall. For example, it is possible to realize operations that utilize virtual servers to flexibly increase and decrease resources at service start-up when demand is unpredictable, stably operate the service using the non-virtual servers when demand has been steadily determined more or less, and increase resource utilization efficiency by aggregating the virtual servers when the time to migrate to the next system draws near.

BRIEF DESCRIPTION OF DRAWINGS

FIG. 5(a) shows a VLAN ID management table in the first example of the present invention.

FIG. 5(b) shows the VLAN ID management table in the first example of the present invention.

DESCRIPTION OF EMBODIMENTS

Example 1

According to this example, a system for dynamically configuring a common network is provided in order to allow a non-virtual server to also exist and be used in a cloud environment configured from a virtual server. In particular, procedures for creating virtual and non-virtual servers, and network configuration procedures performed as a part of the configuration procedures thereof will be described below.
<Physical Configuration and Logical Configuration>

Figure 1:
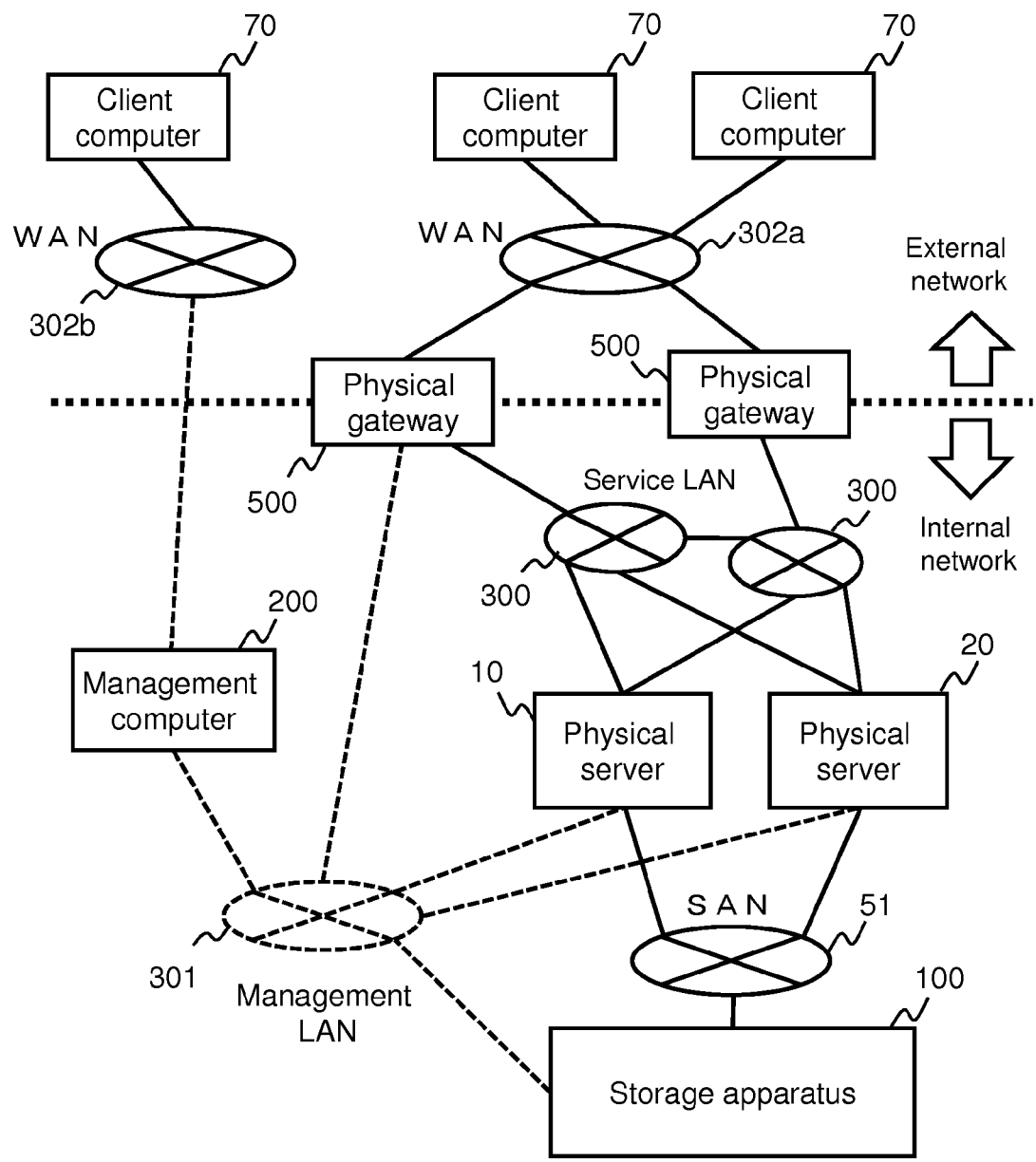
FIG. 1 shows the overall configuration of a computer system in an example of the present invention.

FIG. 1 shows an overall image of a computer system in this example.

In this drawing, a user who receives a server application-based service uses a client computer 70. One or more client computers 70 are physically connected via a local area network (LAN) 300 and a wide area network (WAN) 302 so as to be able to communication with one or more physical servers 10 and 20.

In this example, a distinction is made mainly between, for example, the (service) LAN 300 to which the physical server 10 is connected, and, for example, the WAN 302 to which the client computer 70 is connected, and for explanation purposes, the former is called an internal network, and the latter is called an external network.

A physical gateway 500 is interposed on the boundary between the internal network and the external network, performs various processing for communications data that flows to this physical gateway 500, and controls communications. The configuration of the gateway and the functions possessed by the gateway will be explained in detail later. In order to simplify the explanation, FIG. 1 shows a simple configuration, but as needed, the gateway may be multi-stage, and the WAN 302 may be a LAN. In addition, the WAN and/or the LAN may be either physically or logically segmented into a plurality of networks.

Furthermore, a management computer and a management interface for various other apparatuses (for example, the physical server 10 and a storage apparatus 100) are connected to one another via a management LAN 301.

The one or more physical servers 10 and 20 are each connected to the storage apparatus 100 via a storage area network (SAN) 51.

Figure 2:
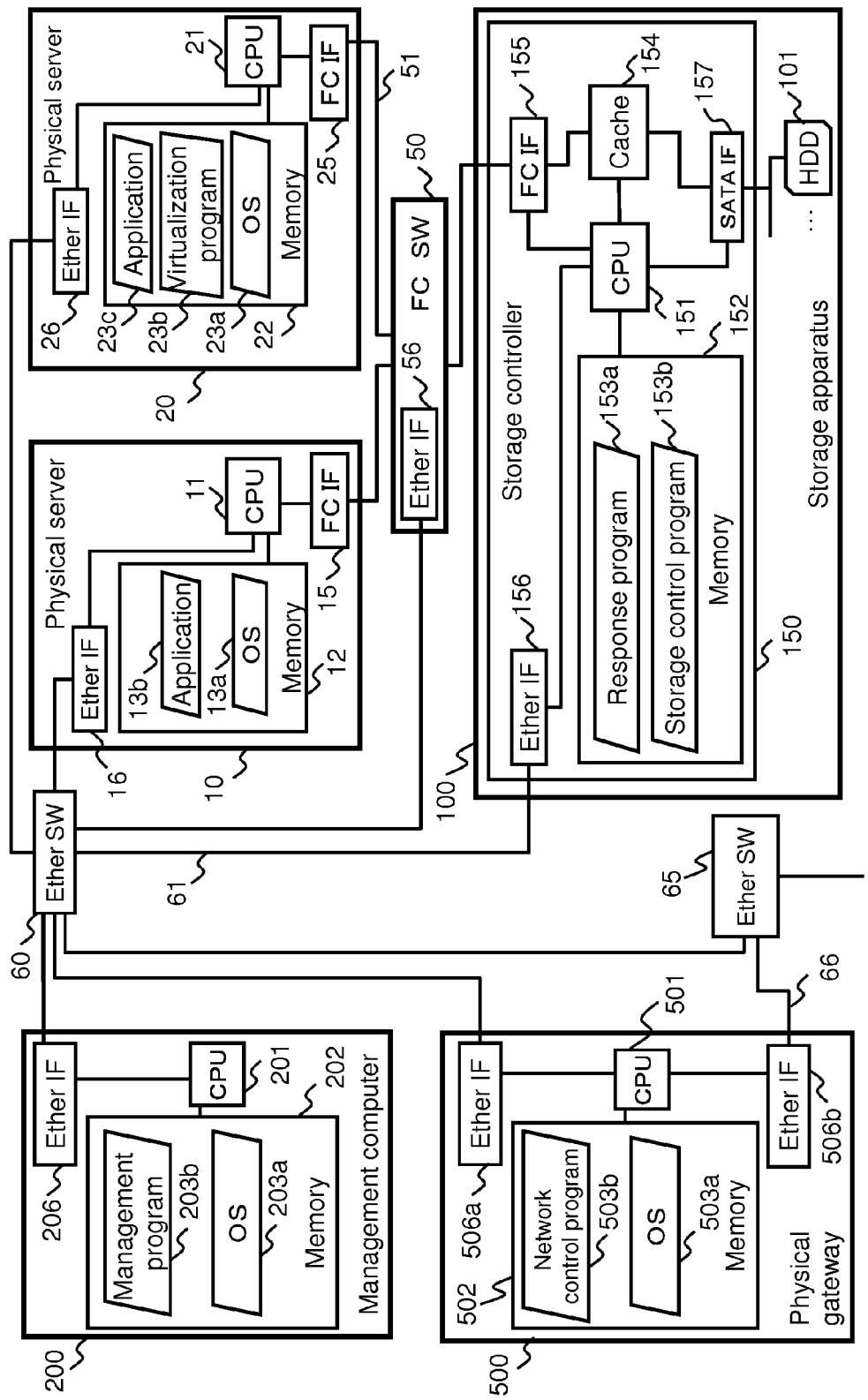
FIG. 2 shows the physical configuration of the computer system in an example of the present invention.

FIG. 2 shows more detailed physical and logical configurations of the apparatuses connected to the internal network. The internal network 300 in FIG. 1 is represented as a network 61 in FIG. 2. At least one or more of a first physical server 10, a second physical server 20, the storage apparatus 100, and the management computer 200 are physically connected to the network 61. In addition, one or more gateways 500 are connected to the boundary of the network 61 and a network 66. Here, the network 66 in FIG. 2 corresponds to the external network 302 in FIG. 1.

The first physical server 10 is provided with a CPU 11, a memory 12, a fibre channel interface (FC IF) 15, and an Ethernet (hereinafter registered trademark) interface (Ether IF) 16. At the least an OS 13a is stored in the memory 12, and in accordance with arithmetic processing by the CPU 11 provides processing resources to an application 13b operating on the physical server 10. Hereinafter, in the sense that the OS 13a operates directly on the physical server 10 without a virtualization program operating, the physical server 10 may be called either a non-virtual server or a bare metal server.

The FC IF 15 is for carrying out communications with another apparatus via a network 51, and is used mainly for the purpose of connecting a storage resource. A communication standard other than the fibre channel may be used as long as it is an interconnection technique that achieves the same purpose, and a plurality of interfaces may be physically provided or the interface may be logically divided into a plurality of interfaces in accordance with the application. The Ether IF 16 is for carrying out communications with other apparatuses via a network 60, and is used for the purpose of communicating with other physical servers 10, 20, and the management computer 200. This interface may be based on a communication standard other than Ethernet as long as it is an interconnection technique that achieves the same purpose, and a plurality of interfaces may be physically provided or the interface may be logically divided into a plurality of interfaces in accordance with the application.

The second physical server 20 is provided with a CPU 21, a memory 22, an FC IF 25, and an Ether IF 26. At the least an OS 23a and a virtualization program 23b are stored in the memory 22, and in accordance with the arithmetic processing of the CPU 21, partition the physical resources of the physical server 20 into one or more virtual resource areas and provide same to another OS or application 23c. The virtualization program 23b does not necessarily have to be separate from the OS 23a, and as long as a function for partitioning the physical server 20 into virtual resource areas is provided, may be implemented as one of the modules inside the OS 23a, or may be implemented as the OS 23a itself. The virtualization program 23b is generally called a virtual machine monitor (VMM) or a hypervisor, and in the following explanation these terms refer to the same thing. A portion of the physical server 20 hardware is extracted as a closed resource area using a virtualization program 23b function. This resource area comprises the hardware of a single logical server called a virtual machine, and the second physical server 20 may be called a virtual machine host. Details concerning the FC IF 25 and the Ether IF 26 are the same as the case of the first physical server 10.

The network 51 is for mutually connecting the one or more storage apparatuses 100 to the one or more physical servers 10 and 20. This makes it possible for the physical servers 10, 20 to communicate with the storage apparatuses 100, and to provide the necessary storage resources when the applications 13b, 23c are operating. One or more fibre channel switches (FC SW) 50 may be disposed on the network 51. The configuration of an FC SW 50 is configured by the management computer 200 via the network 61 to which an Ether IF 56 is connected.

The network 61 is used mainly for the following three purposes. A first purpose is to provide service communications between the client computer 70 and the physical servers 10 and 20. For example, the physical server 10 receives a processing request and/or processing-target data from the client computer 70, and sends data that was either processed or created by the application 13b to the client computer 70 once again.

A second purpose is to change the configurations of the physical servers 10 and 20 involved in the service communications. For example, a new application 23c may be launched on the physical server 20, or a resource area called a virtual server may be created on the virtualization program 23b.

A third purpose is to change the configuration of the data network 51 between the physical servers 10, 20 and the storage apparatus 100. For example, this makes it possible to utilize storage resources by creating a storage resource unit called a volume, and configuring a logical communication channel with a physical server through a storage controller 150 of the storage apparatus 100.

The storage apparatus 100 is formed by integrating a plurality of physical storage devices 101, is provided with a storage controller 150 that controls the apparatus in a centralized manner, and provides a storage resource for storing data to another apparatus, such as a physical server. As shown in FIG. 2, a nonvolatile storage device called a hard disk drive (HDD) or a solid state drive, for example, is used as a physical storage device 101.

The storage controller 150 is provided with a CPU 151, a memory 152, a cache 154, an FC IF 155, an Ether IF 156, and a serial advanced technology attachment interface (SATA IF) 157. At least a response program 153a that responds to a read/write request, and a storage control program 153b that controls an apparatus logical configuration are stored in the memory 152, and the functions of the storage apparatus 100 are realized in accordance with arithmetic processing by the CPU 151. The cache 154 is used mainly for improving a response performance of a storage resource with respect to a physical server read/write request. The FC IF is for carrying out communications with another apparatus via the network 51, and is used mainly for the purpose of connecting to the physical servers 10, 20. A communication standard other than the fibre channel may be used as long as it is an interconnection technique that achieves the same purpose, and there may be a plurality of FC IFs depending on the number of physical servers. The Ether IF 16 is for carrying out communications with another apparatus via a network 60, and is used mainly for the purpose of connecting to the management computer 200.

The management computer 200 is provided with a CPU 201, a memory 202, and an Ether IF 206, and functions mainly to change the configuration of another apparatus. At least an OS 203a that controls the management computer hardware, and a management program 203b are stored in the memory 202, and the functions of the management computer 200 are realized in accordance with the arithmetic processing of the CPU 201. A plurality of management programs 203b may be operated in accordance with the application so long as these programs do not exceed the processing capabilities allowed by the management computer 200. The management program 203b will be described in detail below. The Ether IF 206 is for carrying out communications with another apparatus via the network 60.

One or more physical gateways 500 exist on the boundaries of the internal network 61 and the external network 66, and function to apply a specific policy to communication data that passes through the gateway and/or communication data that flows inside the internal network. The gateway in this example is generally called a router, and, for example, implements either one or a plurality of functions, such as a layer 3 router, a firewall, network address translation (NAT), a proxy, a reverse proxy, a VPN router, and port forwarding. The physical gateway 500 has a CPU 501, a memory 502, and an Ether IF 506 the same as the physical servers 10 and 20 and the management computer 200. An OS 503a and either one or a plurality of network control programs 503b reside in the memory 502, and the functions of the physical gateway 500 are realized in accordance with the arithmetic processing of the CPU 501. Furthermore, the physical gateway 500 possesses at least a plurality of Ether IFs 506, and these interfaces can be logically categorized as an internal network 61-side first interface 506a and an external network 66-side interface 506b. The functions realized by the network control program 503b will be described in detail below.

The network 66 is an external network as viewed from the physical servers 10 and 20, the management computer 200, and the storage apparatus 100. Although not shown in FIG. 2, there may be a gateway external to the network 66. Also, the network 66 may be configured via an Ether SW 65.

<Instance Configuration Method>

The computer system in this example provides functions for managing the configuration of virtual server and non-virtual server resources. The configuration and functions of the system will be explained below by giving an example of a configuration procedure when creating a virtual server and a non-virtual server. Here, a server that is created in accordance with a user request and provides an information service to a client is called an instance, a virtual service is called a virtual instance, and a non-virtual server is called a physical instance.

Figure 3:
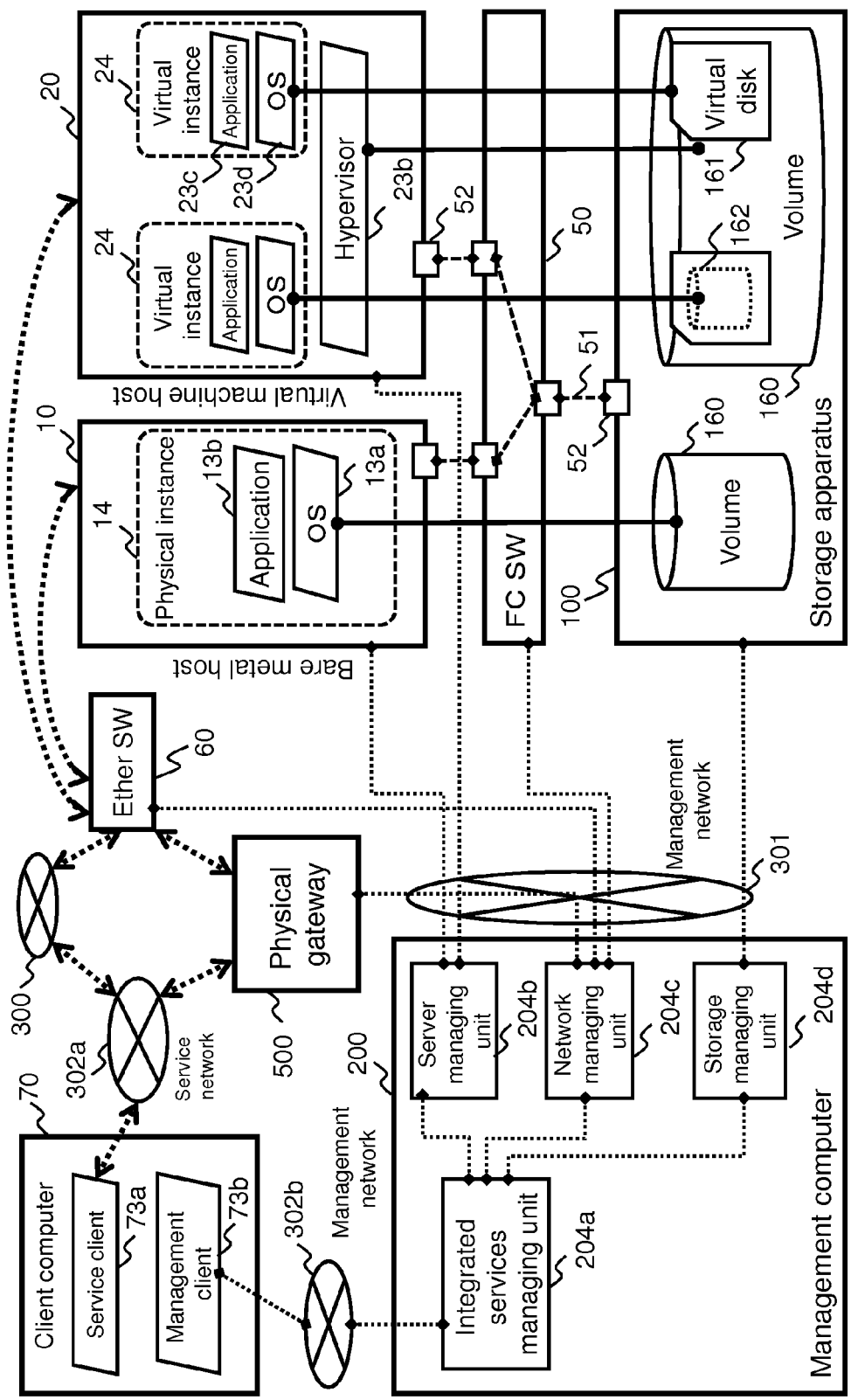
FIG. 3 shows the logical configuration of the computer system in an example of the present invention.

FIG. 3 shows the system configuration for controlling resources allocated to an instance in this example. When creating a desired instance, an end user accesses the management computer 200 using a management client 73b on the client computer 70. The management computer 200 is connected to the client computer 70 via a management network 302b, and receives an instance creation request transmitted by the management client 73b in an integrated services managing unit 204a, which is a kind of management program 203b (or a configuration element). The integrated services managing unit 204a controls in a coordinated manner apparatus managing units (a server managing unit 204b, a network managing unit 204c, and a storage managing unit 204b) that manage the configurations of the respective apparatuses, and carries out the work of creating an instance.

More specifically, an instance is created using the following procedure.

The integrated services managing unit 204a issues a volume creation request to the storage managing unit 204d. At this time, the storage managing unit 204d reserves storage resources inside the storage apparatus 100 in a logical unit called a volume. In a case where an appropriate volume already exists, this volume creation procedure is omitted. By going through the below-described procedures, the volume is recognized by a server apparatus as a non-volatile storage device, such as a disk drive, for example. When the volume is created, the storage managing unit 204d responds to the integrated services managing unit 204a with a volume status, and the identifier of the FC IF 155 capable of being used by the volume. Thereafter, the integrated services managing unit 204a selects a physical server for creating the instance in conjunction with the volume creation procedure. When a virtual instance is requested, the physical server 20, which meets the configuration requirements of the hypervisor, is selected, and when a physical instance is requested, the physical server 10, which meets the configuration requirements of the instance, is selected. Next, the integrated services managing unit 204a uses the network managing unit 204c to configure a communication path on the FC SW 50. This configuration is necessary because the FC SW 50 controls communication-enabled fibre channel ports using a technique called zoning. This makes it possible for the port 52 of the selected physical server 10 or 20 to communicate with the port 52 of the storage apparatus 100. The integrated services managing unit 204a uses the storage managing unit 204d to configure an access control function, such as host storage domain or LUN security. The integrated services managing unit 204a boots up an installer of either OS 13d or 23d through the server managing unit via which the volume is recognized as a disk device from the physical server, and implements a permanent OS environment 13a on the disk drive. Ordinary network installation technology that uses a PXE server or a TFTP server, for example, can be used to transfer the installer. When there is a request from a user, the integrated services managing unit 204a installs middleware and/or the application 23c. As another method for implementing a new OS environment in a storage device like this, there is a method that replicates an OS environment that has already been set up, and this will be described in detail below.

In the example shown in FIG. 3, in the case of a physical instance 14, the instance 14 is configured so that a volume 160 inside the storage apparatus 100 connects to the OS 13a and data used by an application 13b can be stored. In the case of a virtual instance, the server managing unit 204b uses a hypervisor 23b to create a file called a virtual disk 161 inside the volume 160, and connects the virtual disk 161 to a guest OS 23d of the virtual instance 24. It is recognized from the guest OS 23d of the virtual instance 24 as if a virtual disk drive 162 provided by the virtual disk 161 has been connected. The configurations of the virtual disk 161 and the virtual instance 24 are directly controlled by the hypervisor 23b.

In addition, the integrated services managing unit 204a uses the network managing unit 204c to configure an Ether SW 61 and/or an Ether IF for connecting to the internal network 300, and also configures a gateway 500 for connecting to the external network 302a. Details will be explained below in conjunction with a tenant network configuration method.

Information regarding the state of an instance is provided to the management client 73b by the integrated services managing unit 204a, and presented to the user. The user uses a desired service client 73a to utilize the information services of the respective instances via the service network 302a. In addition, the user can use the management client 73b to change the configuration of an instance as needed. The function for changing the configuration of an instance is the same as the case of instance creation described hereinabove in that this change is realized in accordance with the integrated services managing unit 204a and the respective apparatus management units. In other words, the integrated services managing unit 204a uses a combination of configuration changing functions provided by the respective apparatus managing units to implement an instance configuration change required by the user.

<Layer 2 Network Configuration Method>

One object of the present invention is to use either a virtual instance or a physical instance properly in accordance with application requirements and a user request. Thus, a private network that bridges the virtual instance and the physical instance has to be configured to enable mutual communications.

When network apparatus compatibility and hypervisor specifications are taken into consideration, the most common method of configuring a private network is to use a (Layer 2) VLAN and a (Layer 3) router.

Control of the range of network communicability can be realized using layer 2, or layer 3 network configuration, and can also be realized via other layers, but the method described in the present paragraph is widely used for constructing a flexible private network in accordance with a user request while ensuring security. That is, it is a method for configuring, on an internal network for which performance is required but there is no need to strengthen security, a network with assured layer 2 connectivity as a single layer 3 segment, and utilizing layer 3 routing control in external network communications with another segment that requires application-linked high-level security management. A VLAN ID is assigned to one private network, which is independent from another private network at the layer 2 level. To interconnect the different private networks, a communication is performed via the layer 3 router using an IP address.

According to this method, the private network that bridges the virtual instance and the physical instance constitutes layer 2 transmission, and, for example, configuration management that uses a DHCP or some other such broadcast can be utilized. The present description describes a method for configuring a layer 2 network on Ethernet switches.

Figure 4:
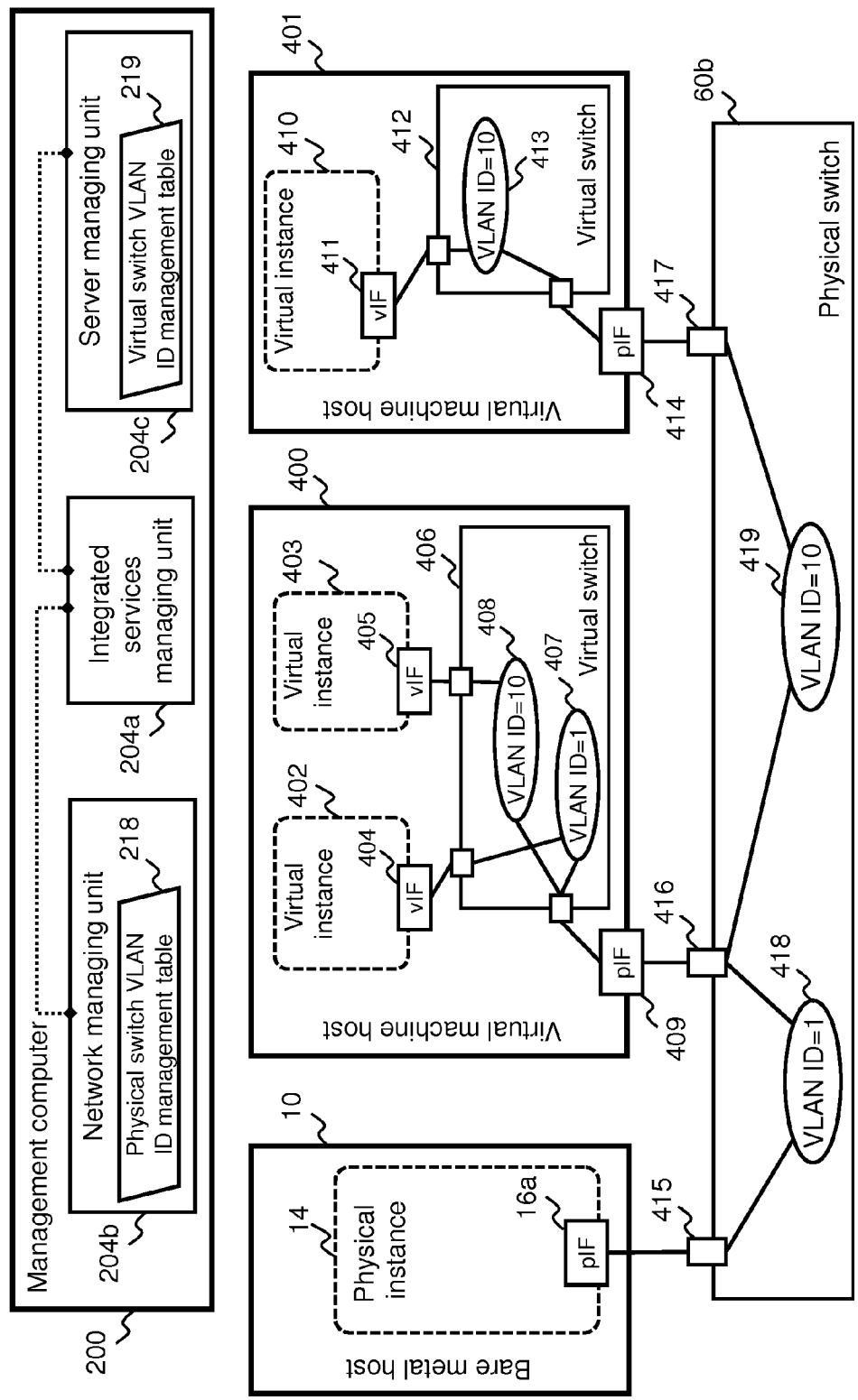
FIG. 4 shows the network configuration of the computer system in a first example of the present invention.

FIG. 4 shows an example of the configuration of a private network. A method for configuring a layer 2 network will be explained below using this drawing. VLAN is a technique for logically multiplexing a single physical network apparatus that configures a LAN in accordance with an identifier called a VLAN ID that is assigned to a packet. The VLAN ID can be configured and released on a switch apparatus and host Ether interface, but in an environment in which a plurality of hosts are created at arbitrary times like that targeted by the present invention, control may be deemed to be performed using switches alone. The reason for not using a method of control that utilizes an Ether interface is because, according to this method, an Ether interface VLAN configuration most likely will not be possible until after the OS boots up, resulting in operations prior to OS boot-up becoming temporarily uncontrollable.

The configurations of all the apparatuses, that is, the physical servers 10 and 20, and the Ether switch 60b are controlled by the management computer 200. Each physical switch 60b, and the virtual switches 406 and 412, which are implemented by the hypervisor on the virtual machine hosts 400 and 401, conform to VLAN, and provide layer 2 (datalink layer) connectivity spanning a plurality of switches by assigning the same VLAN ID. Alternatively, a layer 2 network is segmented by assigning different VLAN IDs. For example, a virtual Ether IF 405 of a virtual instance 403 is connected to a network with a VLAN ID of 10, and is able to communicate with a virtual instance 410 (on a different virtual machine host) that is connected to a network with the same VLAN ID of 10. On the other hand, the virtual Ether IF 405 is unable to communicate with a virtual instance 402 (on the same virtual machine host) that is connected to a network with a VLAN ID of 1, which is different from the virtual instance 403. In a conventional environment with only virtual instances, the physical switch 60b configuration could be a configuration (trunk all) that allows all VLAN IDs for all ports. In this case, since communication authorization/non-authorization between virtual instances is completed using only virtual switch configurations, these configurations are implemented by the server managing unit 204c that manages the hypervisor. Therefore, a management infrastructure of an existing virtual server environment generally does not have a physical switch configuration function.

In the case of a bare metal host 10, the internal network is configured using a port-based VLAN. More specifically, on the physical switch 60b, a port-based VLAN attribute (access mode) is assigned to port 415 to which the bare metal host is connected. This makes it possible for only ports that have the same VLAN ID to communicate. These port-based VLAN configurations are implemented by the network managing unit 204b.

In order to achieve the object of the present invention, both the virtual instance and the physical instance must be connected to the same VLAN to communicate with one another. When the VLAN ID is the same, layer 2 connectivity is assured, and in the example of FIG. 4, the Ether IF 16a of the physical instance and the Ether IF 404 of the virtual instance communicate with one another via the internal network 413 with a VLAN ID of 1. The port-based VLAN attribute is assigned to the port 415 at this time, but a tagged VLAN attribute must be assigned to the port 416, and only VLAN IDs of 1 and 10 can be allowed. This is because the data sent and received by the two virtual instances 402 and 403 is multiplexed in the port 416 to the virtual machine host 400. Thus, the physical switch configuration, which could have been trunk all in the past, must be appropriately controlled in accordance with the location of the instance. In addition, since the physical switch configurations and the virtual switch configurations are respectively implemented by the network managing unit 204b and the server managing unit 204c of different management systems, a new scheme is needed to achieve matching therebetween.

In the present invention, the integrated services managing unit 204a provides a configuration management method that configures VLANs on a virtual switch and a physical switch so that there are no mismatches. More specifically, the configuration information of both the network managing unit 204b, which has a physical switch VLAN ID management table 218 for managing the physical switch VLAN configuration, and the server managing unit 204c, which has a virtual switch VLAN ID management table 219 for managing the virtual switch VLAN configuration, is referenced and configured.

FIG. 5(a) shows the physical switch VLAN ID management table 218. This table stores a host ID 218a, a switch ID 218b, a port ID 218c, a port attribute 218d, and a VLAN ID 218e. This table preserves the port attribute configuration of the physical switch. For example, a second record shows that port #03 on switch SW01 is a trunk port connected to VLAN IDs 1 and 10. When a plurality of physical switches are cascade-connected, the switch ID is preserved in the host ID field 218a instead of that of the host.

FIG. 5(b) shows the virtual switch VLAN ID management table 219. This table stores an instance ID 219c, a switch ID 219*d*, a port ID 219*e*, and a VLAN ID 219*b*. This table preserves the port attribute configuration of the virtual switch in the same manner as the physical switch VLAN ID management table 218. These VLAN ID management tables reside on the management computer 200, and are applied to physical switching apparatuses and virtual switches on virtual machine hosts in accordance with various management program configurations.

<Processing Flow>

Figure 6:
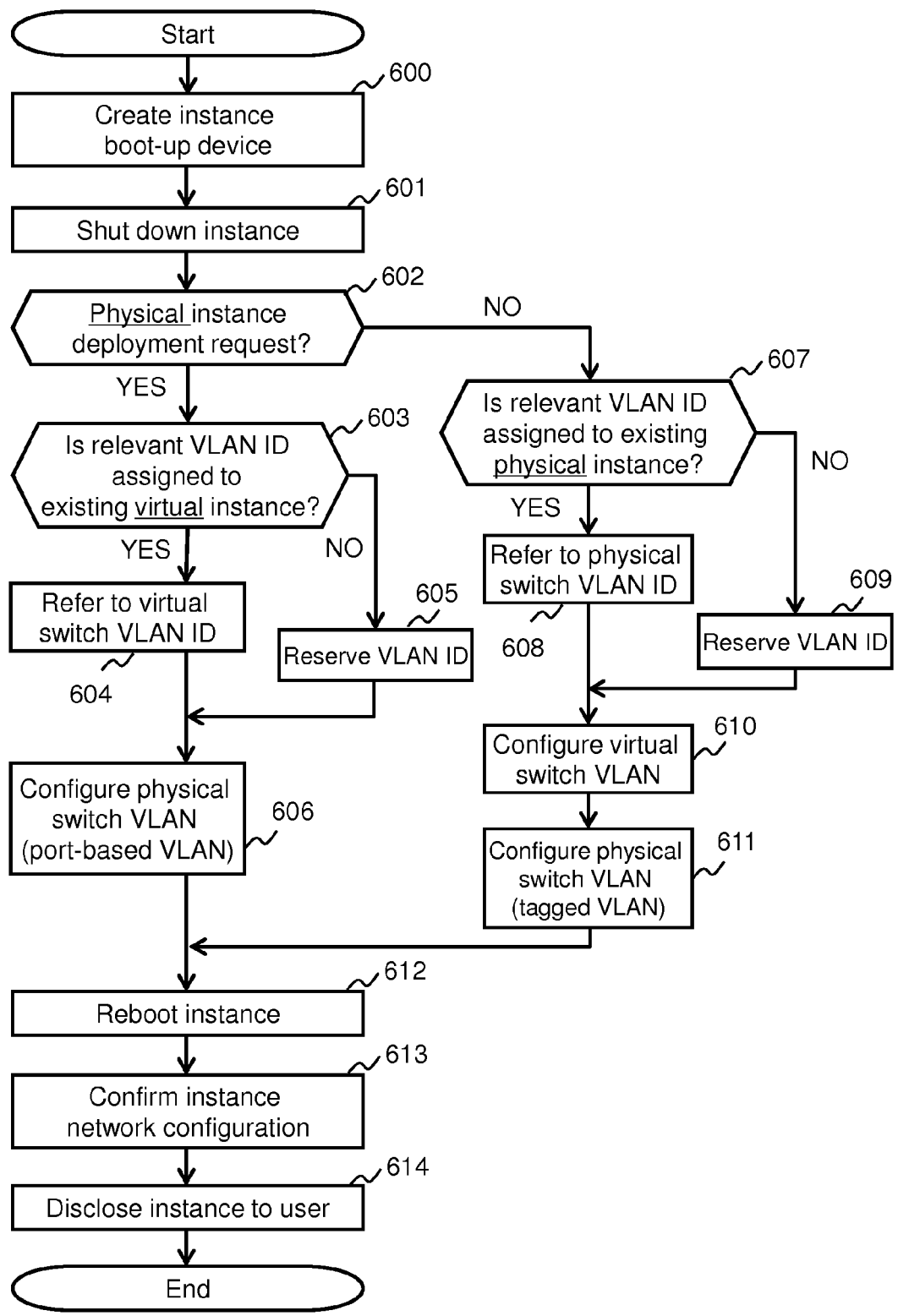
FIG. 6 shows a processing flow in the first example of the present invention.

A characteristic network configuration of the present invention is illustrated in a processing flow shown in FIG. 6. A detailed description of the integrated services managing unit will be provided below, and the procedures for configuring a network using a VLAN will be described in detail here. The purpose of this processing flow is to take advantage of the creation of a new instance to configure a private network that interconnects instances in an environment where a virtual instance and a physical instance coexist.

In addition, the processing flow in this example targets a procedure for adding an instance, and assumes that any of one or more existing instances are operating on the same VLAN. Furthermore, to configure a new VLAN and create a new instance, a VLAN ID that is not in either VLAN ID management table should be reserved and the configuration should be implemented in the same manner as below.

When a user uses the management client 73*b* to transmit an add instance request, the integrated services managing unit 204*a* authenticates the user authorization, and the procedure for creating the aforementioned instance on an existing private network commences. The user specifies existing instances between which mutual connections are desired and performs an add request for a new instance. When the procedure for creating the aforementioned instance is complete in Step 600, then in Step 601 the instance is temporarily shut down, and processing moves to a procedure for configuring a private network.

In the condition determination of Step 602, processing branches in accordance with the type of instance.

In a case where a new physical instance is to be deployed, processing advances to Step 603, where processing branches once again in accordance with whether a virtual instance or a physical instance is connected to the specified existing private network.

When it has been determined in Step 603 that a virtual instance is connected to the private network, processing advances to Step 604. In this same step, the integrated services managing unit 204*a* refers to the virtual switch VLAN ID management table 219, and identifies the virtual switch VLAN ID from the specified virtual instance ID.

Alternatively, in a case where an existing physical instance was specified, the processing branches from Step 603 to Step 605. At this time, the integrated services managing unit 204*a* refers to the physical switch VLAN ID management table 218 and identifies the physical switch VLAN ID from the specified physical instance ID (host ID). In a case where a plurality of physical switches are cascade-connected, all the required VLAN configurations are implemented by tracing the switch IDs preserved in the host ID field 218*a*.

The VLAN ID specified in the previous step is configured on the port of the physical switch in Step 606. Furthermore, since the port is connected to a newly added bare metal host at this time, a port-based VLAN attribute is configured.

The processing flow from the aforementioned Step 602 to Step 606, for example, applies to the case in FIG. 4 where the physical instance 14 is created anew to be interconnected with the virtual instance 402. At this time, the integrated services managing unit 204*a*, on the basis of the instance ID of the virtual instance 402, refers to the virtual switch VLAN ID management table 219 and identifies the VLAN ID 407 of the virtual switch 406 to which the instance 402 is connected. In addition, the integrated services managing unit 204*a* assigns the same VLAN ID 418 to the port 415 to which the newly created physical instance 14 is connected. In accordance with this, the connectivity between the existing virtual instance 402 and the new physical instance 14 is established based on a VLAN ID of 1.

In a case where the user has requested the addition of a virtual instance, the processing branches from Step 602 to Step 607. In the same manner as the previous example (Step 603), in a case where interconnection with an existing physical instance has been specified, in Step 608, the integrated services managing unit 204*a* refers to the VLAN ID configuration of the physical switch. Or, in a case where interconnection with an existing virtual instance has been specified, the processing advances to Step 609, and the integrated services managing unit 204*a* identifies to the VLAN ID of the virtual switch to which this virtual instance is connected.

In a case where a virtual instance is to be added, the desired interconnection of the existing instances is realized by way of Step 610 for configuring the VLAN ID identified in the previous step on the virtual switch and Step 611 for configuring the VLAN ID identified in the previous step on the physical switch. Furthermore, in Step 611, since the virtual machine host is connected to the port of the physical switch, a tagged VLAN attribute is configured.

The above processing flow from Step 602 to Step 611 applies to the case in FIG. 4 where the virtual instance 403 is created anew to be interconnected with the virtual instance 410. At this time, the integrated services managing unit 204*a*, on the basis of the instance ID of the virtual instance 410, refers to the virtual switch VLAN ID management table 219 and specifies the VLAN ID 408 of the virtual switch 406 to which the instance 403 is connected. In addition, the integrated services managing unit 204*a* assigns the same VLAN IDs 408 and 419 to the ports 416 and 417 of the virtual switch 406 and the physical switch 60*b* to which the newly created virtual instance 403 is connected. In accordance with this, the connectivity between the existing virtual instance 410 and the new virtual instance 403 is established based on a VLAN ID of 10.

When the instance is re-booted in Step 612, the instance is operated once again based on the aforementioned private network configuration. Communications using this network configuration are confirmed in the following Step 613 by receiving an ICMP by another instance on the private network to which the same VLAN ID has been assigned, for example.

Normally, when the addition of an instance is complete, the user is notified to the effect that use of the instance will commence. At this time, the user may be notified of a network address together with user account information for accessing the instance.

According to this example, the same VLAN that spans a plurality of physical switches and virtual switches is defined, and private networks on which physical instances and virtual instances coexist are configured. These private networks are logically segmented at the layer 2 level, and security from other private networks is assured. In addition, in a case where logical network IDs are managed completely independently as with the network managing unit 204*b* and the server managing unit 204c in FIG. 4, the above-described configuration is realized without making changes to the management tables thereof.

Example 2

According to this example, there is provided a system that dynamically configures tenant networks in which virtual servers and non-virtual servers coexist in a cloud environment. In particular, after assuring the performance required for each instance by using either the virtual server or non-virtual server properly, the system can be operated on the basis of network control policies configured for each tenant.

<Gateway Functions>

One object of the computer system described in this example is to control the feasibility of access to resources and applications for carrying out processing in accordance with the duties of a user and the authorization of an organization or the like to which the user belongs. This makes it possible to operate a desired business system without one's data being illegally accessed by another user, and/or having performance affected.

Therefore, in a network that connects servers, or a client and a server, a technique for realizing access control that corresponds to a user authorization is important. In this example, a gateway has a function for applying a communication policy to communications that flow over a network, and realizes access control therefor.

In general, the term gateway refers to a network protocol converter for layer 4 and above, as well as to a layer 3 router. However, in the present specification, a network appliance having either one or a plurality of functions for layer 3 and above protocol conversion and policy control, which will be described later, will be called a gateway.

In the above explanation, a gateway is treated as a type of physical computer. More accurately, a gateway is a network control computer called a network appliance. For example, as shown in FIG. 2, the configuration thereof is substantially the same as that of another physical server and/or management server, the only difference being the programs in the memory 502 and/or the number of Ether IFs 506. Therefore, a gateway does not necessarily have to be installed as a physical computer, and may be realized as a type of virtual server. However, in a portion of the implementation, processing that utilizes software in this example may be implemented by using hardware dedicated to executing the same processing.

Below are concrete examples of typical functions provided in a physical gateway and a virtual gateway in this example. Furthermore, all of the functions are based on common techniques, international standards, and de facto standards in the field of network technology.

(1) Router/Layer 3 Switch

A router/layer 3 switch is a function for performing routing control and/or protocol conversion in the network layer of the OSI reference model. Implementation adopts a scheme for storing the IP addresses of neighboring routers and/or hosts in a destination table, and sending the destination table to a relevant apparatus in accordance with the destination address of a received communications packet. Therefore, processing for referencing destination information of a received packet, processing for deciding a destination in accordance with the referenced information, or processing for regularly updating the destination table are performed, and the processing load increases in accordance with increases in the amount of communications data and/or the number of connected hosts. In addition, since a function for connecting different data link layers (for example, Ethernet and FDDI) may be implemented at the same time, and the processing costs of the functions are significant compared to processing performed on the host side, a dedicated apparatus is often prepared.

A virtual router redundancy protocol (VRRP) may also be implemented to increase availability, and, in principle, a plurality of routers may exist. The term "virtual router" may be used for the VRRP, but in this example refers to something that differs from a virtual gateway.

(2) Network Address Translation

In certain networks, there is a function, which is generally called network address translation (NAT), for translating an address for communicating on the internal side to an address for communicating with the external side. For example, NAT is widely used due to the fact that IPv4 global addresses were not prepared in sufficient numbers to be able to be assigned to all local computers. An address is translated on a NAT gateway, which is a relay point, without changing the address of the local computer side to enable transparent communications with devices on the Internet. TCP/IP installation guarantees the consistency of communications by using a combination of a local address and a port number.

Furthermore, NAT translates the IP address, but a function, called MAC address translation (MAT) that keeps the IP address the same and translates a MAC address may also be used.

(3) Firewall

A firewall is a function that allows/destroys/rejects a communication passing through a gateway in accordance with layer 3 control information (destination port number) and/or layer 4 protocols. A firewall is mostly used to prevent unauthorized entry to an internal network from an external network for the purpose of increasing security, and it is important that the firewall be able to be flexibly configured in accordance with the applications of the hosts and the characteristics of the users connected to the internal network.

By installing a firewall, the status of a TCP/UDP session may be monitored, and an unauthorized communications packet may be blocked.

(4) Proxy

A proxy is a function mainly for using as a substitute a proxy server, which is able to interpret application layer protocols (for example, HTTP and/or FTP), to selectively carry out communications from an internal network to the outside world. A proxy is introduced for the purpose of strengthening security, balancing loads, caching, and so forth. Since a different server responds on behalf of a specified communication partner, a proxy differs from NAT in that, because the address differs from that of the communication-requesting host, it is not transparent.

A proxy is provided with advanced functions for providing control at the application layer, such as redirecting the web browsing of a specific URL, but on the other hand, processing costs are high compared to a firewall that simply monitors port numbers and/or destination IP addresses.

A function that controls communications in the opposite direction, that is, communications from an external network to an internal network so that these communications pass through a specific server, may be called a reverse proxy, and this function is included in this example.

In addition, the gateway described in this example assumes functions, such as a VPN router that constitutes the relay point/terminus of a virtual private network (VPN), a remote console gateway for providing a user interface that is remotely operable from an external network, and port forwarding for relaying the communication session of a specific port number destination.

As needed, a function for controlling a network configuration is also provided. For example, a DHCP server function may be used to dynamically configure an IP address for an instance.

<Tenant Network Configuration Method>

The tenant network configuration method will be explained by first describing an ordinary method of configuring a tenant network, and then describing the characteristic configuration method of the present invention.

A tenant network is used to ensure the resource security and processing performance of each tenant made up of users and/or a user group. The most common method of configuring a private network is use of (Layer 2) VLAN and (Layer 3) routers taking into account network apparatus interchangeability and hypervisor product specifications at the present time.

Control of the range of network communicability can be realized using layer 2, or layer 3 network configuration, and can also be realized via other layers, but the method described in the present paragraph is widely used for constructing a flexible private network in accordance with a user request while ensuring security. That is, it is a method for configuring, on an internal network for which there is no need to strengthen security, a network with assured layer 2 connectivity as a single layer 3 segment, and utilizing layer 3 routing control in external network communications with another segment that requires application-linked high-level security management. According to this method, the tenant network constitutes layer 2 transmission, and, for example, configuration management that uses a DHCP or some other such broadcast can be utilized. Consequently, the present paragraph describes a method for configuring an ordinary tenant network by constructing a layer 2 network on Ethernet switches, and thereafter performing routing on a layer 3 network.

Figure 7:
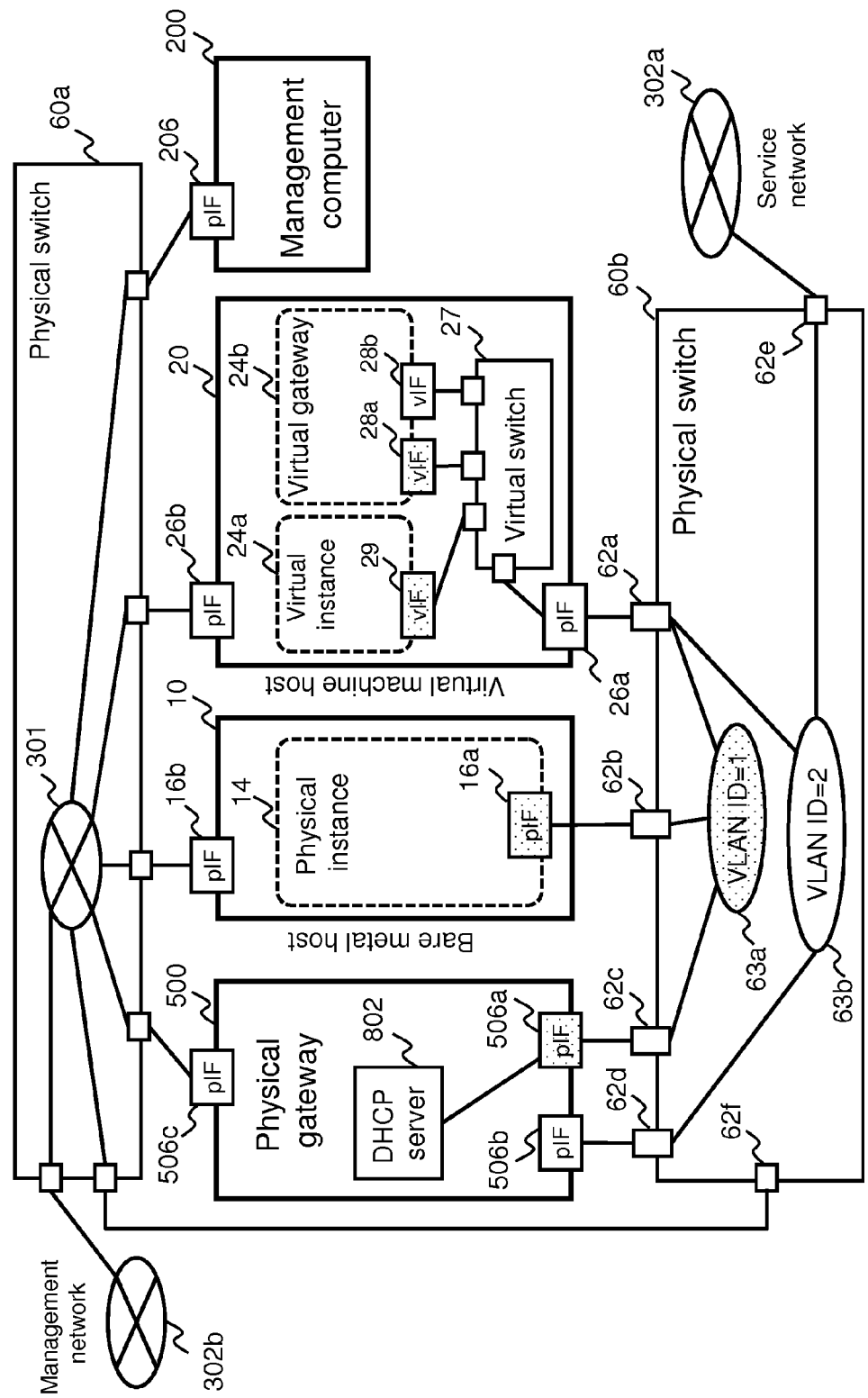
FIG. 7 shows the network configuration of the computer system in a second example of the present invention.

FIG. 7 shows an example of the configuration of a tenant network. A method for configuring a layer 2 network will be explained below using this drawing.

The configurations of all the apparatuses, that is, the physical servers 10 and 20, the physical gateway 500, and the Ether switches 60a and 60b are managed by the management computer 200. For these apparatuses, the physical Ethernet interfaces are connected to the management network 301 and are able to communicate with one another. The physical switches 60a and 60b, and a virtual switch 27, which is implemented by the hypervisor on a virtual machine host 20, conform to VLAN, and provide layer 2 (datalink layer) connectivity by assigning the same VLAN ID.

In the case of the bare metal host 10 and the physical gateway 500, the internal network is configured using port-based VLAN. More specifically, on the physical switch 60b, a port-based VLAN attribute (access mode) is assigned to ports 62b, 62c, 62d to which the bare metal host is connected. This makes communication possible only between ports having the same VLAN ID, and divides the physical switch 60b into an internal network 63a for hosts to communicate with one another, and an external network 63b for communicating with the outside via a gateway. An internal network 63a, and an internal network side interface 506a of the gateway 500 are prepared for each tenant, and, in principle, are only able to be used by the users and resources that belong to this tenant. In other words, the users and resources belonging to this tenant are separated at the layer 2 network level from the physical instance 14 that belongs to another tenant.

In a case where an internal network according to virtual servers 24a and 24b is divided from an external network by the layer 2 network, a tagged VLAN is configured on the virtual switch 27 and on the physical switch 60b. More specifically, different VLAN Ids are assigned respectively to the internal network 63a and the external network 63b on the hypervisor-provided virtual switch 27. Furthermore, a tagged VLAN attribute (either a trunk mode or a tagging mode) is configured on the virtual host-side port 62a of the physical switch to allow communication of packets having the aforementioned VLAN ID tag configured on the virtual switch.

In particular, in a case where operations are performed using only virtual instances as in the past, the trunk mode is configured for the physical switch so as to allow all tagged VLANs to communicate with one another. This makes it possible to create a private network using only the virtual switch 27 configuration on the hypervisor, and there is no need to change the configuration of the physical switch each time. Therefore, in the management infrastructure of an existing virtual server environment, it is common for the physical switch not to have a configuration function.

In a case where the VLAN IDs are the same, layer 2 connectivity is assured, and in the example of FIG. 7, the Ether interface 16a of the physical instance and the Ether interface 29 of the virtual instance communicate with one another using the layer 2 internal network 63a with a VLAN ID of 1. At this time, a broadcast, for example, will reach the physical instance 14, the virtual instance 24a, the physical gateway 500, and the virtual gateway 24b.

In addition, according to the prior art, a gateway is installed, and connectivity with the external network 63b is assured. The connection with the gateway is controlled in the layer 3 network configuration. For example, a gateway is specifiable as a default gateway when configuring a network address in each instance. Specification-wise, (the IP address) of only one default gateway can be configured for one instance. Therefore, in an ordinary cloud environment, a virtual gateway 24b is created for each tenant, and all communications with the external network are configured so as to go through the gateway 24b. Furthermore, normally a subnet is created within the space of the same VLAN ID under the control of the gateway 24b. The OS that operates each instance has a routing table as its own network configuration information, and all communications with an address destination that is not in the routing table (an address that is an unknown location on the network and is not a neighboring host) are sent to the default gateway.

When using a physical instance to achieve stable performance in a cloud environment, a desired tenant network can be constructed by configuring the network so that the physical instance connects to an existing virtual instance environment via a layer 2 network and goes through an existing virtual gateway.

<Characteristic Tenant Network Configuration Method of Present Invention>

In the method of configuring a tenant network using the prior art, the virtual gateway constitutes a performance bottleneck. As described above, in the case of a physical instance as well, an advantage of being able to flexibly change configuration can be obtained when using a virtual gateway in the same manner as a virtual instance; however, the likelihood of the performance of the virtual gateway being affected by another virtual server cannot be ruled out.

A user who uses a physical instance expects stable performance, and it is extremely difficult for this user to put up with a gateway whose network performance fluctuates from one workload to the next.

Alternatively, in a method that specifies a physical gateway for all instances to include a virtual instance, stable performance can be provided in a physical instance, but using the physical gateway for a virtual instance is inefficient. A user who utilizes a virtual instance probably hopes to increase resource utilization efficiency or to reduce costs in proportion to the amount of resources used, but considers that stable performance can be sacrificed for these purposes. Hence this eliminates the need for a physical gateway that has abundant performance.

There is also prior art that configures a plurality of gateways as a single gateway and makes use of a gateway entity that applies common policies in accordance with a load; however, the problem is that, in addition to requiring the implementation on the gateway of complex functions, such as a load monitoring function and/or uninterrupted route switching function, this prior art is the best possible strategy by any means, but does not guarantee performance.

Figure 8:
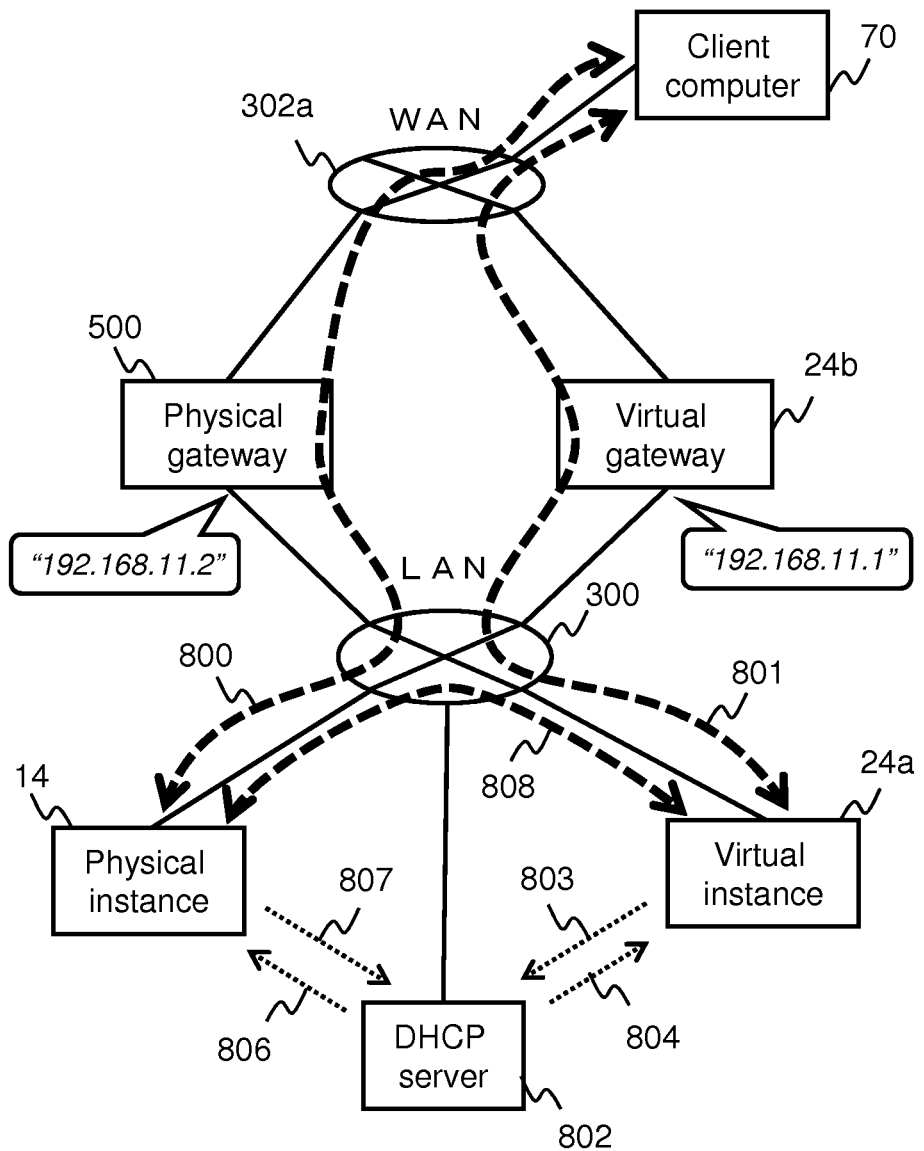
FIG. 8 shows a concept of DHCP server-based network routing in the second example of the present invention.

According to this example, a method of configuring a tenant network that solves for the above problems is provided. That is, it is a method that performs layer 3 routing control so that in the configuration shown in FIG. 7, the virtual instance goes through the virtual gateway, and the physical instance goes through the physical gateway. FIG. 8 shows a conceptual diagram of the configuration method.

As shown in FIG. 8, in this example, the virtual instance 24a and the physical instance 14 both connect to the internal network (LAN) 300, and also connect to the external network (WAN) 302a via gateways to provide a service to a client computer 70. At this time, an intercommunication 808 of the virtual instance 24a and the physical instance 14 is performed within the same subnets connected via layer 2, but an external communication 801 with the virtual instance 24a is performed via the virtual gateway 24b, and an external communication 800 with the physical instance 14 is performed via the physical gateway 500.

Both gateway configurations utilize a dynamic host configuration protocol (DHCP) server 802. The DHCP server 802 is installed on the LAN 300 side of one of gateways.

When the virtual instance 24a is created, connects to the LAN 300, and broadcasts an IP address allocation request 803, the DHCP server 802 delivers an IP address for use by the virtual instance 24a, and also responds with the address (192.168.11.1 in the drawing) of the virtual gateway 24b as a default gateway.

Alternatively, when the physical instance 14 is created, the DHCP server 802 responds to an IP address allocation request 807 in the same manner with an address (for example, 192.168.11.2) for the physical gateway 500 as a default gateway.

Figure 9:
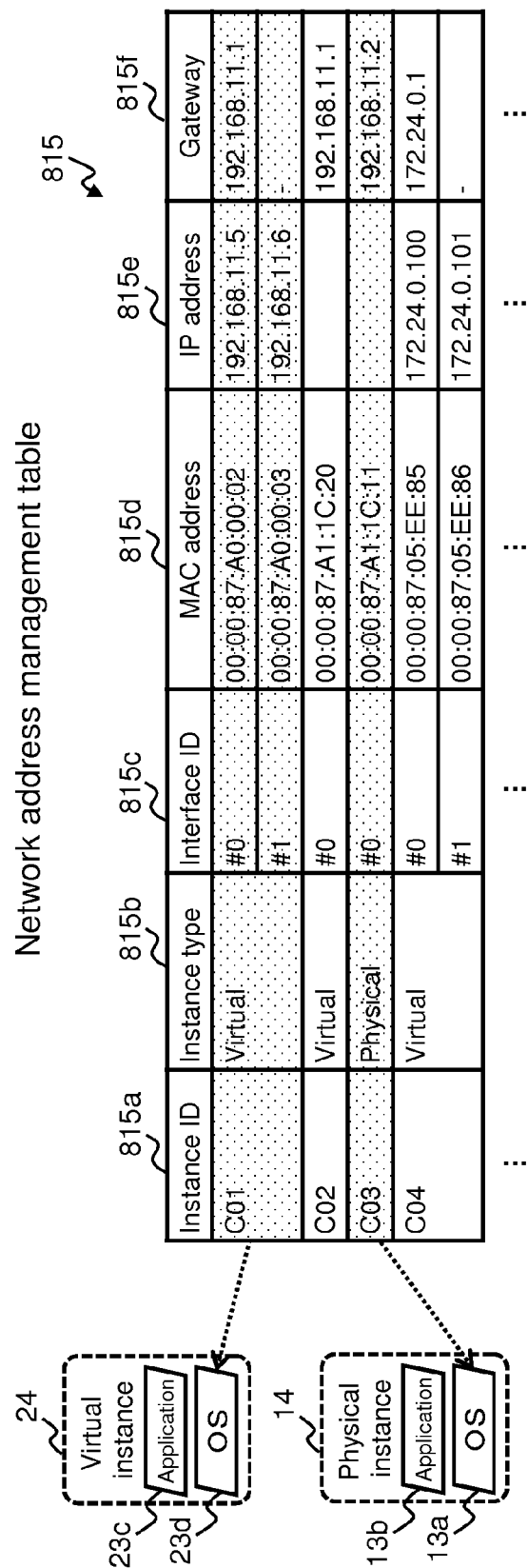
FIG. 9 shows a network address management table in the second example of the present invention.

The DHCP server 802 in this example has a network address management table 815 that is shown in FIG. 9. In the implementation of a standard DHCP server, the DHCP server identifies a DHCP client (in this example, the virtual instance and the physical instance) using a MAC address, and in accordance with a request, responds with a pool-managed IP address and specifies a subnet mask, a DNS server, and a default gateway. In FIG. 9, too, a set comprising a MAC address 815d and an allocation IP address 815e is managed for an instance 815a in the same manner. In this example, in addition, a different gateway 815f is specified in accordance with an instance type 815b. Each of these pieces of network configuration information is preserved by the OS of the relevant instance, and more accurately, in a network instance management area. The method for selecting an instance type 815b and a gateway 815f will be described later.

<Processing Flow>

The configuration of the management computer and the processing flow in this example will be explained below.

Figure 10:
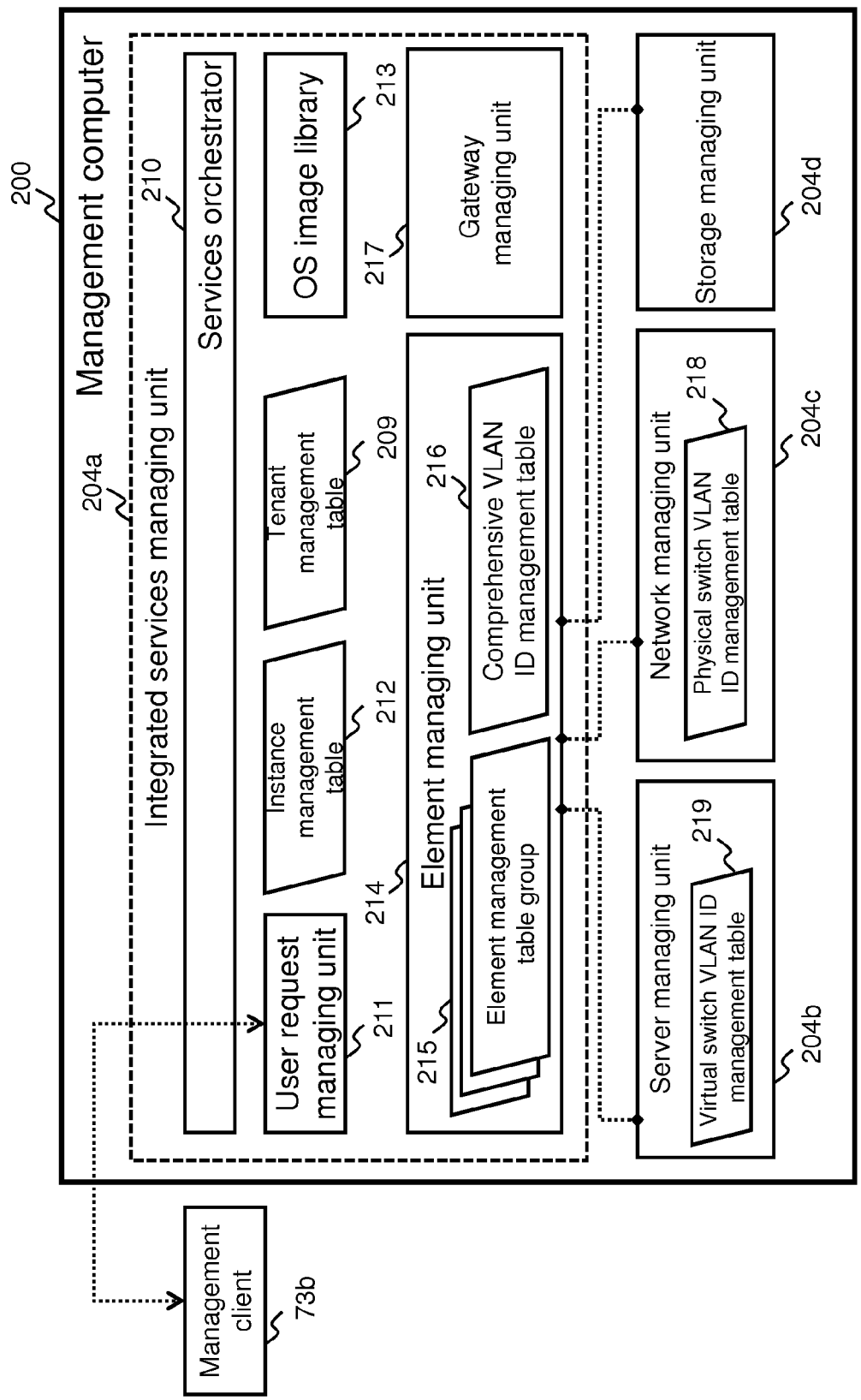
FIG. 10 shows in detail a management computer in the second example of the present invention.

FIG. 10 shows a detailed configuration of a management program 203b of the management computer 200. The above-described integrated services managing unit 204a further comprises: a user request managing unit 211 for receiving a request from a management client 73b; an instance management table 212 for managing instance configuration information; an OS image library 213 for preserving an OS image to be introduced into an instance; an element managing unit 214 for managing the configurations of a group of apparatuses in the system; a gateway managing unit 217 for managing the configuration of a gateway; and a service orchestrator 210 that activates the same in a coordinated manner. The respective apparatus managing units (the server managing unit 204b, the network managing unit 204c, and the storage managing unit 204d) subordinate to the integrated services managing unit 204a are mainly controlled under the element managing unit 214. The element managing unit 214 is provided with an element management table group 215 that aggregates all apparatus configurations, and a comprehensive VLAN ID management table 216 that aggregates the VLAN IDs configured on network switches.

Figure 11:
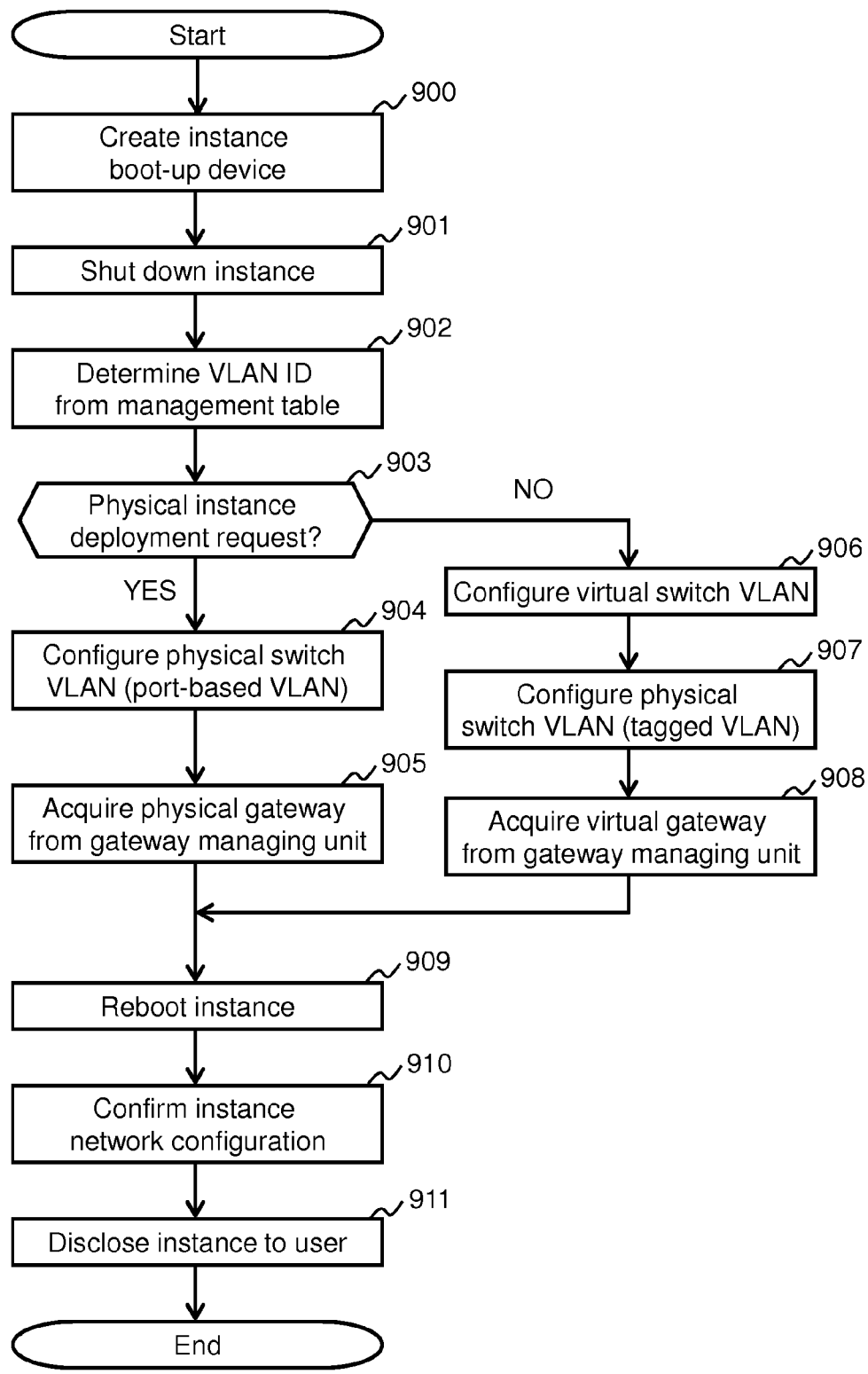
FIG. 11 shows a processing flow in the second example of the present invention.

FIG. 11 shows a processing flow for configuring a tenant network accompanied by instance creation in this example.

Figure 12:
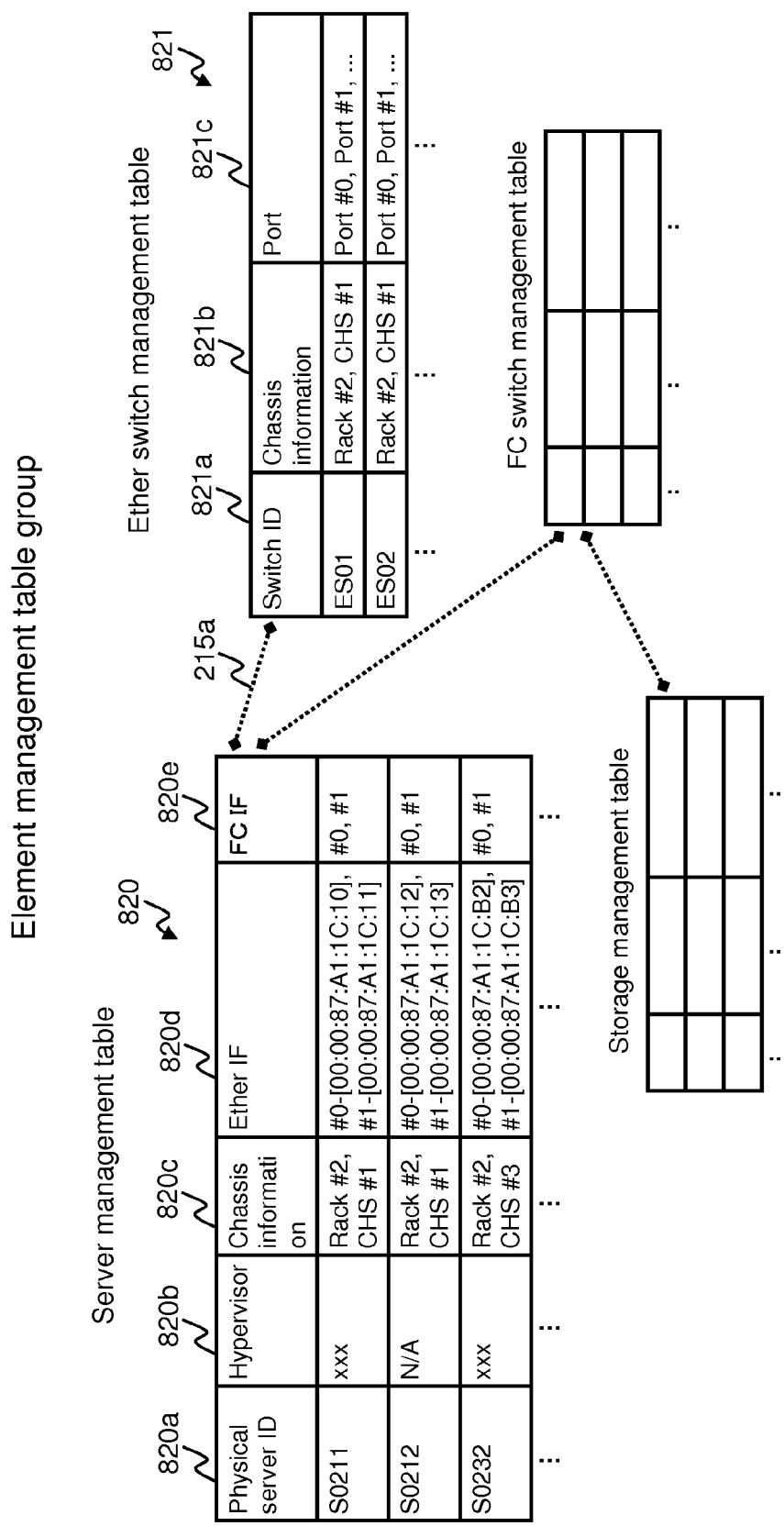
FIG. 12 shows groups of element management tables in the second example of the present invention.

When a user transmits an instance creation request using the management client 73b, the user request managing unit 211 of the integrated services managing unit 204a authenticates the user authorization, and the above-described procedure for creating an instance commences. An apparatus configuration is managed in the element management table group 215 shown in FIG. 12. The element management table group 215 is made up of management tables replicated from the apparatus managing units, for example, a server management table 820 for managing the configuration of a server apparatus, a physical switch management table 821, and so forth. By examining the element management table group 215, it is possible to ascertain the operating condition of an apparatus, and/or connection relationships and other such configurations. For example, by examining the hypervisor field 820b of the server management table 820, it is possible to determine whether the hypervisor has been introduced or not. In addition, association information 215a created when an apparatus was registered in the management computer is included in the element management table group 215, making it possible to learn, for example, which instance 820d of which server 820a is connected to the physical port 821c of which switch 821a. When an instance is created, the free capacity of the resources is acquired from each apparatus managing unit on the basis of the element management table group 215, and a creation-destination apparatus determination is made.

In Step 900, when the above-described procedure for creating an instance is complete, in Step 901, the instance is temporarily shut down, and processing moves to the procedures for configuring the tenant network.

Figure 13:
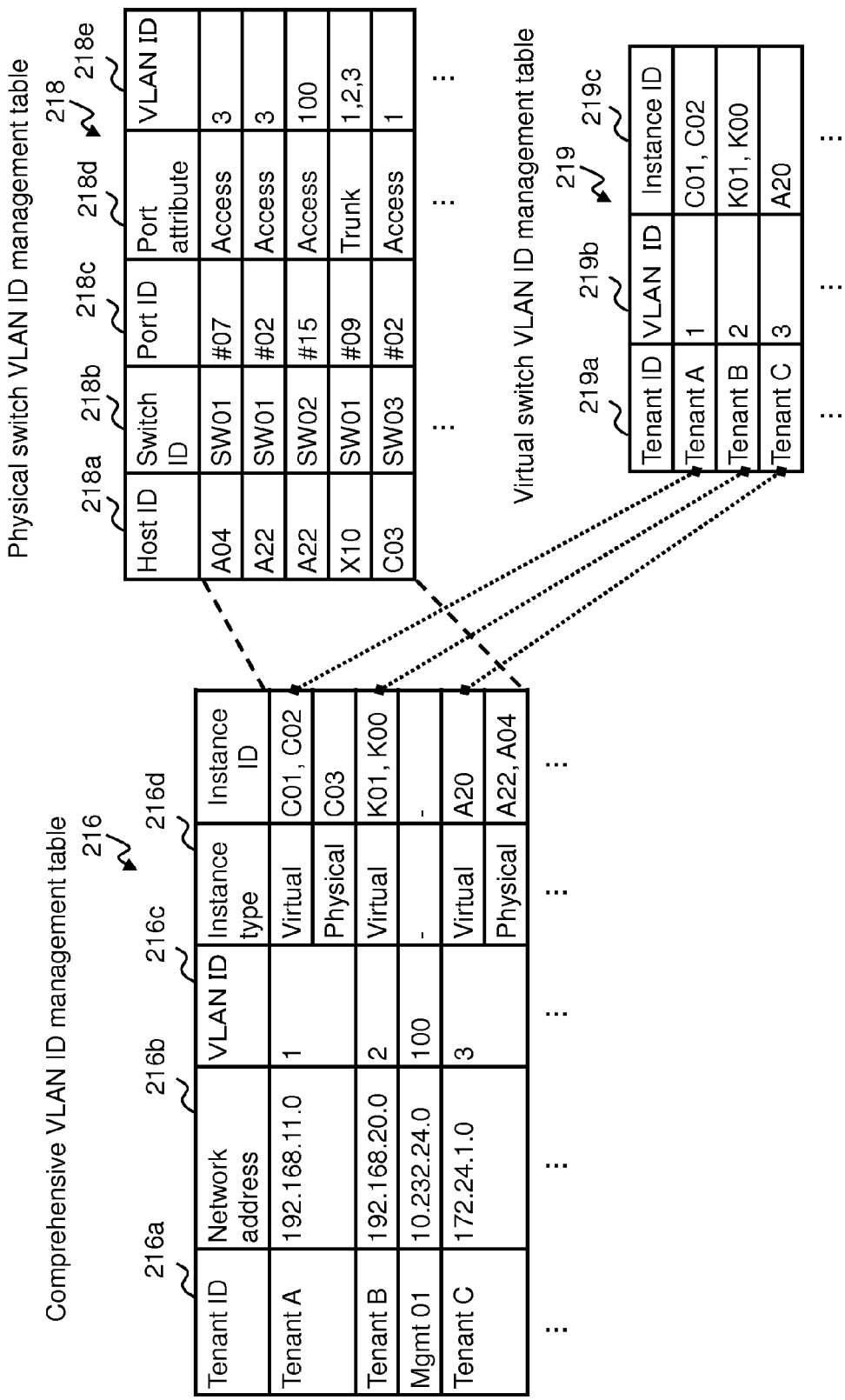
FIG. 13 shows the relationship of management tables involved in VLAN ID management in the second example of the present invention.

In Step 902, a VLAN ID is determined in accordance with a user request. In this example, the association of a tenant and a VLAN ID is managed in the comprehensive VLAN ID management table 216. FIG. 13 shows this table in detail. The network managing unit 204c aggregates the information of the physical switch VLAN ID management table 218 and the virtual switch VLAN ID management table 219 without mismatches. As described in the first example, there is also a method for respectively preserving only the management tables for the virtual/physical switches, but VLAN-based logical network segmentation can be appropriately configured even using a method for separately holding an aggregated management table like the comprehensive VLAN ID management table. While the physical switch management information is preserved in the network managing unit 204c, the virtual switch is one of the functions implemented by the hypervisor, and the management information thereof is preserved in the server managing unit 204b. In a case where the user executes a request for adding an instance to an existing tenant network, the VLAN ID 216b of the tenant ID 216a specified by the user is referenced. In a case where the user is requesting the creation of a new tenant network, a new tenant ID 216a and VLAN ID 216b are reserved and added to the comprehensive VLAN ID management table 216.

In Step 903, the processing branches in accordance with whether the user request is a physical instance or a virtual instance.

In a case where the user is requesting the addition of a physical instance, in Step 904, a physical switch VLAN is configured. More specifically, a determination is made as to whether or not the relevant VLAN ID 218e can be configured in the physical switch VLAN ID management table 218 (whether it duplicates another ID, or is within a configurable range from the standpoint of apparatus specifications), and the port attribute 218d corresponding to the physical server (host) ID 218a is configured to the access mode (port-based VLAN attribute). In addition, in Step 905, usable physical gateway information is acquired from the gateway managing unit 217 specifying the instance gateway. Here, the gateway managing unit 217 preserves the internal network-side IP address of at least this gateway for specifying the physical gateway 500. In a case where an appropriate physical gateway for constructing a physical connection relationship does not exist, either the processing is terminated, or a new physical gateway is created using the same method as the method for creating a physical instance. In this example, the same physical gateway is also configured for the DHCP server. More specifically, created instance information, the MAC address 815d therefor, and a gateway IP address are registered in the network address management table 815.

In a case where the user is requesting the addition of a virtual instance, in Step 906, first a virtual switch VLAN is configured. More specifically, a determination is made as to whether or not the VLAN ID 219b can be configured in the virtual switch VLAN ID management table 219, and a VLAN ID 219b that corresponds to the tenant ID 219a and the instance ID 219c is configured. Next, in Step 907, the corresponding physical switch VLAN ID management table 218 is edited. More specifically, a determination is made as to whether or not the relevant VLAN ID 218e can be configured in the physical switch VLAN ID management table 218, and the port attribute 218d corresponding to the virtual server host ID 218a is configured to the trunk mode (tagged VLAN attribute). In addition, in Step 905, usable virtual gateway information is acquired from the gateway managing unit 217 specifying the instance gateway. Here, the gateway managing unit 217 preserves the internal network-side IP address of at least this gateway for specifying the virtual gateway 24b. In a case where an appropriate virtual gateway for constructing a physical connection relationship cannot be created, either the processing is terminated, or a new virtual gateway is created using the same method as the method for creating a virtual instance. In this example, the same virtual gateway is also configured for the DHCP server. More specifically, created instance information, the MAC address 815d therefor, and a gateway IP address are registered in the network address management table 815.

When the instance is rebooted in Step 909, the instance operates by receiving a network configuration allocation from the DHCP server. Communications via this network configuration are confirmed in the following Step 910 by receiving an ICMP by another instance within the same tenant network, for example.

When the addition of the instance is completed normally, the user is notified by the user request managing unit 211 to the effect that use of the instance will commence. At this time, the user may be notified of a network address together with user account information for accessing the instance.

According to this example, a tenant network is configured when a physical instance and a virtual instance have been added in accordance with a service level requested by the user. In addition, a physical instance that requires stable performance operates using a stable-performance physical gateway, and a virtual instance with high resource utilization efficiency operates using a high-efficiency virtual gateway. That is, overall optimization of computational processing resources and storage resources can be realized in accordance with the coexistence of virtual/non-virtual servers, and the overall optimization of network resources can also be realized in accordance with using either one of virtual/physical gateways properly. The distribution ratio for communications with the external network is statically determined in accordance with the instance type requested by the user. Therefore, according to this example, it does not take a long time for proper load balancing to be realized, and the implementation of complex functions and high processing costs are not required as in the prior art-provided scheme for changing the load balancing method by monitoring the communications load.

In the above explanation, the example focused on a tenant network being configured when an instance is created, but the target of the present invention is not limited thereto. For example, this function is realized by the same system configuration in a case where only a new tenant network is created, and also in a case where a virtual instance and a physical instance are mutually migrated.

Furthermore, in this example, the above-described tenant network configuration was realized using VLAN and layer 3 routing control, but the configuration of the present invention is not dependent on these technologies. Therefore, this function is realized by the same system configuration even in a case that uses a technique such as VXLAN, for example, which extends the layer 2 VLAN space by using a layer 3 communication to encapsulate a layer 2 communication.

Example 3

In the first example, use of either one of virtual and physical gateways properly was realized using a DHCP server. However, in an ordinary environment, operations that do not utilize a DHCP server are also performed based on a requirement that states it is desirable to use a static address provided in anticipation of a system failure. According to a DHCP-based network configuration, whereas the management of an IP address pool is performed efficiently, the network configuration must be updated each time an address lease period expires. There is a likelihood that communications between the instances on the tenant will be disabled simply by a failure occurring in the DHCP server at this time.

When a static IP address is used, there is a method for manually configuring a tenant network by way of the management network, but this approach is accompanied by the risk that manual procedures will result in address duplication and more complicated utilization status management. Accordingly, by linking to the management of a master OS image, which forms the basis for the creation of an instance, this example provides a network configuration method that is not dependent on DHCP.

Figure 14:
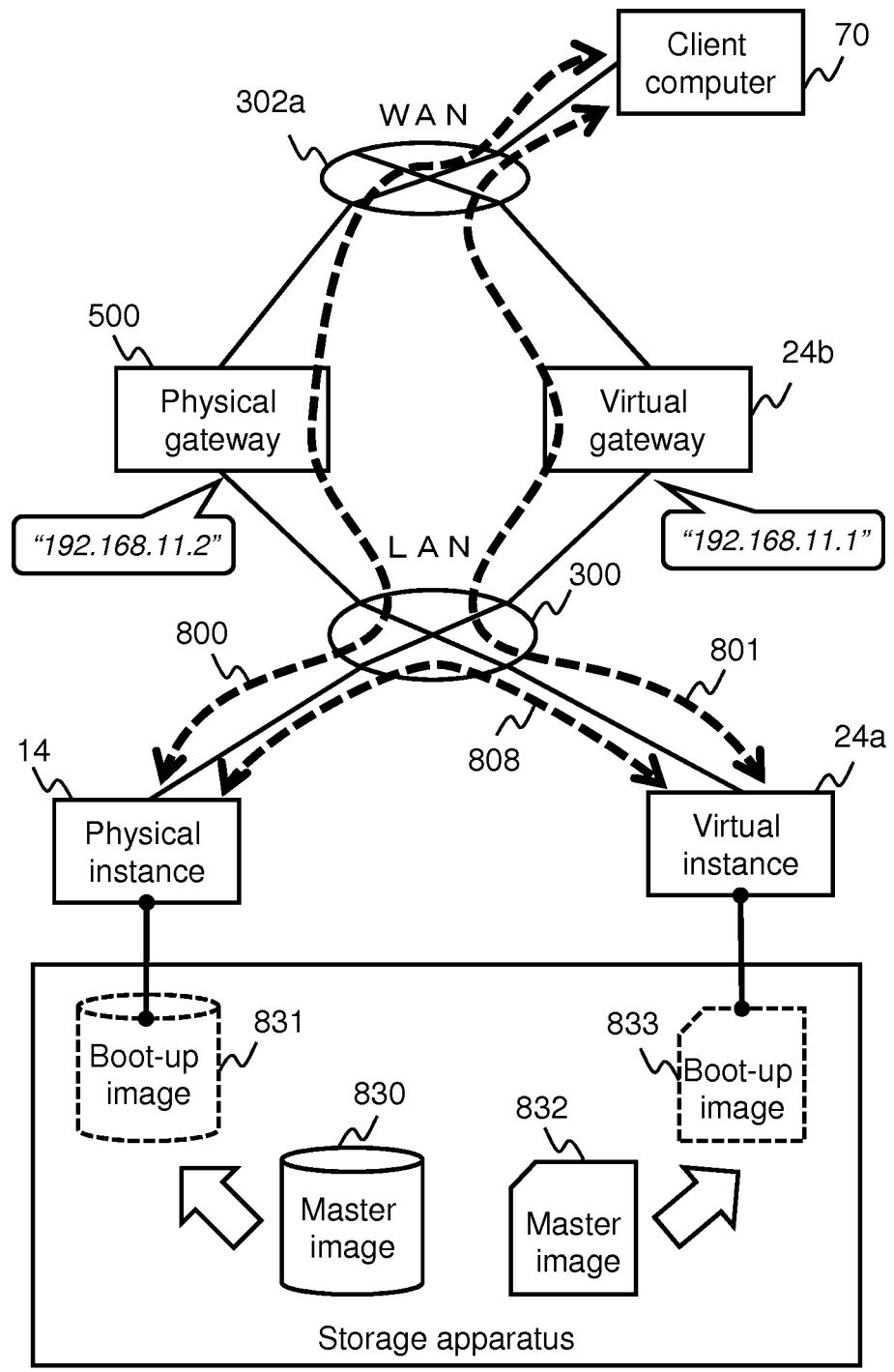
FIG. 14 shows a concept of OS image management-based network routing in a third example of the present invention.

As shown in FIG. 14, except for the fact that a DHCP server is not used, this example has the same system configuration as that of the first example. In particular, this example is characterized in that a network configuration that has been customized in accordance with the virtual/physical instance type is maintained in the OS image library 213. The actual master image recorded in the OS image library 213 is stored on the storage apparatus 100. The master image 830 of physical instance 14 is a volume, and at the time the physical instance is created, a disk device 831 for boot-up is created using a copy function of the storage control program 153b. Alternatively, the master image 832 of the virtual instance takes the form of a virtual disk, and a virtual disk 833 for boot-up is created using a copy function of the hypervisor.

In this example, the network address management table 815 is held on the gateway managing unit 217, and a corresponding network configuration is included in the master image by virtual/physical instance type. More specifically, either a master image is created by using a customized OS image of the network configuration, or an OS initialization file is configured so that the network configuration is read in when the instance is rebooted in Step 909 of FIG. 11.

According to this example, an IP address is statically assigned to a created instance, and a virtual/physical gateway is statically configured in accordance with the virtual/non-virtual server type. There is no need to communicate over the network when implementing this network configuration, and there is also no need to install a DHCP server. In addition, even in a case where a failure occurs in a DHCP server or other such apparatus where network addresses are managed in a centralized manner, the connectivity between the relevant instance and the client computer, and the connectivity between instances connected to the same tenant are preserved. Additionally, making practical use of the high-speed copy function of the storage apparatus 100 has the advantage of not placing a load on the communication bandwidth like a network installation does.

Example 4

According to this example, a distribution function that takes into account a virtual/physical instance is provided for an access from the external network to the internal network. In the above-described implementation example, a method of going through a gateway corresponding to an instance type mainly for an access from the internal network to the external network was described. Alternatively, it is also desirable to distribute access requests from the client computer 70 side to a gateway in accordance with the characteristics of the physical instance and the virtual instance.

In an environment in which virtual/non-virtual instances coexist like that targeted by the present invention, the performance requirements sought by the user are expressed as the number of physical instances and virtual instances. Therefore, a method of statically specifying a gateway in accordance with the scale of the virtual/physical instances on a tenant is believed to enable the realization of a more concise and effective improvement in performance than implementing complicated monitoring and load balancing functions for coping with unexpected fluctuations in access requests.

Figure 15B:
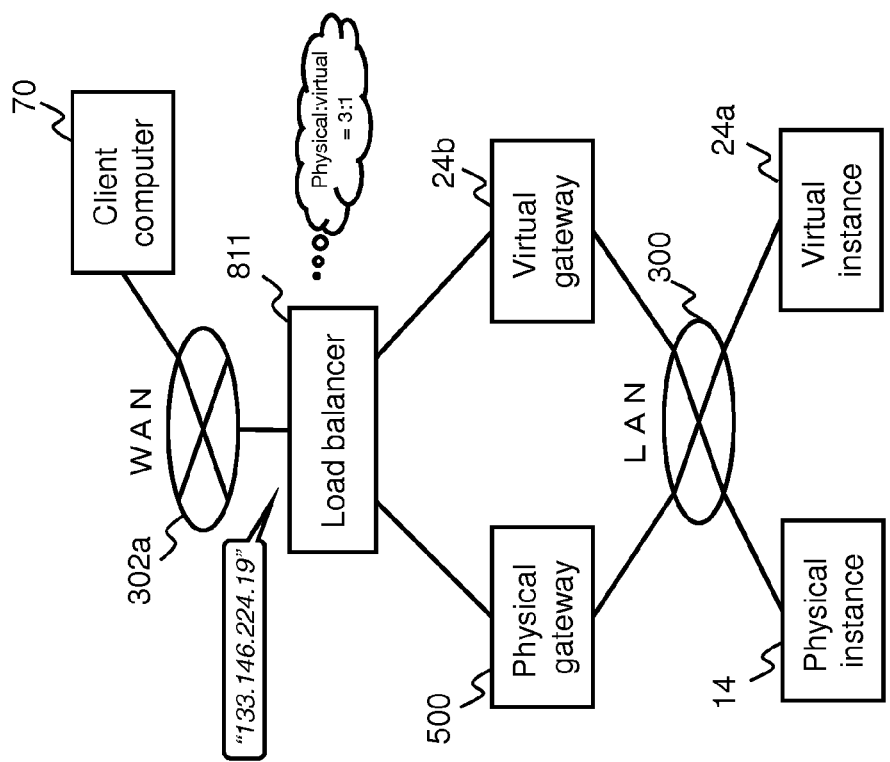
FIG. 15(b) shows a VLAN ID management table in the first example of the present invention.
Figure 15A:
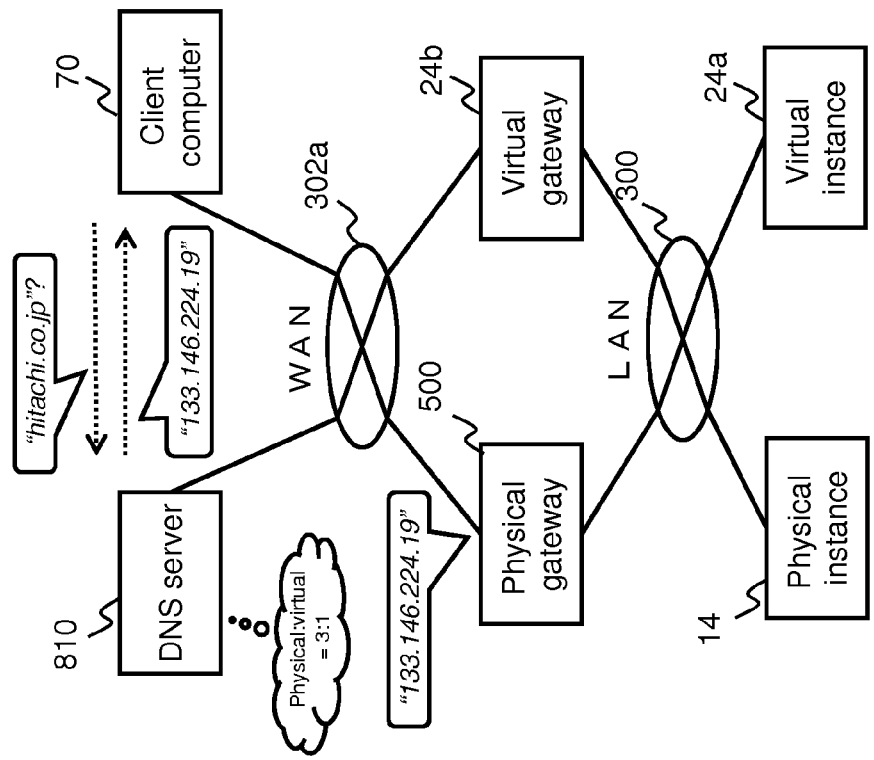
FIG. 15(a) shows a concept of an external access load distribution method in a fourth example of the present invention.

In this example, two configurations, shown in FIGS. 15(a) and (b), respectively, for distributing accesses from the external network to a physical gateway and a virtual gateway are considered.

A first method uses a DNS. A case in which the client computer 70 queries a DNS server 810 to resolve the access destination domain name to an IP address is considered. At this time, the weighting as to whether the IP address of a physical gateway (or a physical instance) should be notified as the destination, or the IP address of a virtual gateway (or a virtual instance) should be notified as the destination is adjusted using the DNS server configuration. More specifically, the DNS server evaluates the performance ratios of the virtual and physical gateways or instances using a certain fixed value, and treats the result as a probability for an IP address response.

The second method disposes a load balancer 811 in front of the gateways. As the load balancing algorithm in an ordinary load balancer, the weighting as to whether to use the physical gateway (or physical instance) as the destination, or to use the virtual gateway (or virtual instance) as the destination is made proportional to the performance ratio of the gateways or instances. The load balancer either operates as a proxy, or provides transparent access using NAT.

According to this example, accesses from the external network are distributed to the physical gateways and the virtual gateways. An external access distribution ratio is determined statically in accordance with the instance type requested by the user. Therefore, according to this example, it does not take a long time for proper load balancing of a client request to be realized, and the implementation of complex functions and high processing costs are not required as in the prior art-provided scheme for changing the load balancing method by monitoring the communications load.

REFERENCE SIGNS LIST

10 First physical server
11 CPU
12 Memory
13a Operating system
13b Application program
14 Physical instance
15 Fibre channel interface
16 Ethernet interface
20 Second physical server
23b Virtualization program
24a Virtual instance
24b Virtual gateway
27 Virtual network switch
50 Fibre channel switch
51 Storage area network
60 Physical network switch
61 Internal ether network
70 Client computer
73a Service client
73b Management client
100 Storage apparatus 150 Storage controller
153a Response program
153b Storage control program
154 Cache
200 Management computer
203b Management program
204a Integrated services managing unit
204b Server apparatus managing unit
204c Network apparatus managing unit
204d Storage apparatus managing unit
300 Internal network
301 Management network
302 External network
500 Management gateway
802 DHCP server

The invention claimed is:

1. A management computer that is connected to a first physical server on which a plurality of virtual instances and a virtual switch for controlling a network between the virtual instances are activated, a second physical server on which a physical instance is activated, and a physical switch that is connected to the first physical server and the second physical server, and that controls a network between the first physical server and the second physical server, the management computer comprising:

a processor; and a memory storing:

virtual switch management information that shows a correlation between each of the plurality of virtual instances and an internal network to which each virtual instance connects;

physical switch management information that shows a correlation between the physical instance and an internal network to which the physical instance connects; and an integration managing unit that, upon execution by the processor, manages the configuration of the first physical server, the second physical server, and the physical switch, wherein, upon receiving a first instance creation request for creating a first virtual instance that connects to the same internal network as the physical instance, the processor:

creates the first virtual instance on the first physical server;

refers to the physical switch management information and identifies a first internal network to which the physical instance connects; and configures the virtual switch and the physical switch so that the first virtual instance is connected to the first internal network.

2. The management computer according to claim 1, wherein the second physical server has a virtualization function that logically divides physical resources of the second physical server and manages the physical resources as a plurality of virtual machines, and the virtual switch and each of the plurality of virtual instances are operated on any of the plurality of virtual machines.

3. The management computer according to claim 2, wherein, upon receiving a second instance creation request for creating a first physical instance that connects to the same internal network as a second virtual instance from among the plurality of virtual instances, the processor:

creates the first physical instance on a third physical server connected to the physical switch;

refers to the virtual switch management information and identifies a second internal network to which the second virtual instance connects; and configures the physical switch so that the first physical instance is connected to the second internal network.

4. The management computer according to claim 2, wherein the second physical server has a virtual gateway that is operated on a first virtual machine from among the plurality of virtual machines, and is connected to the first internal network and an external network by a control of the virtual switch and the physical switch, and the management computer is further connected to a physical gateway that is connected to the first internal network and the external network by control of the physical switch, and wherein in accordance with the first instance creation request, the management computer configures the first virtual instance so that the first virtual instance connects to the external network from the first internal network via the virtual gateway.

5. The management computer according to claim 4, wherein the processor:

configures the physical instance so that the physical instance connects to the second network from the first internal network via the physical gateway.

6. The management computer according to claim 5, wherein the processor:

manages network address information of the physical gateway, and network address information of the virtual gateway; and configures the first virtual instance so that the first virtual instance connects to the external network from the first internal network via the virtual gateway by notifying the physical instance and the first virtual instance of the relevant network address information via a dynamic host configuration protocol (DHCP) server.

7. The management computer according to claim 5, further connected to a storage apparatus that is connected to the first physical server and the second physical server, wherein the processor:

manages the physical gateway network address information and the virtual gateway network address information, and configures the first virtual instance so that the first virtual instance connects to the external network from the first internal network via the virtual gateway by storing in the storage apparatus the virtual gateway address information together with an operating system (OS) master image that is read by the first virtual instance.

8. A network configuration method for a management computer that is connected to a first physical server on which a plurality of virtual instances and a virtual switch for controlling a network between the virtual instances are operated, a second physical server on which a physical instance is operated, and a physical switch that is connected to the first physical server and the second physical server and controls a network between the first physical server and the second physical server, the network configuration method comprising:

managing virtual switch management information that shows a correlation between each of the plurality of virtual instances and an internal network to which a relevant virtual instance connects;

further managing physical switch management information that shows a correlation between the physical instance and an internal network to which the physical instance connects; and upon receiving a first instance creation request for creating a first virtual instance that connects to the same internal network as the physical instance, creating the first virtual instance on the first physical server;

referring to the physical switch management information and identifying a first internal network to which the physical instance connects; and configuring the virtual switch and the physical switch so that the first virtual instance is connected to the first internal network.

9. The network configuration method according to claim 8, wherein the second physical server has a virtualization function that logically divides physical resources of the second physical server and manages the physical resources as a plurality of virtual machines, and the virtual switch and each of the plurality of virtual instances are operated on any of the plurality of virtual machines.

10. The network configuration method according to claim 9, comprising, upon receiving a second instance creation request for creating a first physical instance that connects to the same internal network as a second virtual instance from among the plurality of virtual instances:

creating the first physical instance on a third physical server connected to the physical switch;

referring to the virtual switch management information and identifying a second internal network to which the second virtual instance connects; and configuring the physical switch so that the first physical instance is connected to the second internal network.

11. The network configuration method according to claim 9, wherein the second physical server has a virtual gateway that is operated on a first virtual machine from among the plurality of virtual machines, and is connected to the first internal network and an external network by control of the virtual switch and the physical switch, and the management computer is further connected to a physical gateway that is connected to the first internal network and the external network by control of the physical switch, the method further comprising:

in accordance with the first instance creation request, configuring the first virtual instance so that the first virtual instance connects to the external network from the first internal network via the virtual gateway.

12. The network configuration method according to claim 11, comprising configuring the physical instance so that the physical instance connects to the second network from the first internal network via the physical gateway.

13. The network configuration method according to claim 11, comprising:

managing network address information of the physical gateway, and network address information of the virtual gateway; and configuring the first virtual instance so that the first virtual instance connects to the external network from the first internal network via the virtual gateway by notifying the physical instance and the first virtual instance of the relevant network address information via a dynamic host configuration protocol (DHCP) server.

14. The network configuration method according to claim 12, wherein the management computer is further connected to a storage apparatus that is connected to a first physical server and the second physical server, the method comprising:

managing the physical gateway network address information and the virtual gateway network address information; and configuring the first virtual instance so that the first virtual instance connects to the external network from the first internal network via the virtual gateway by storing in the storage apparatus the virtual gateway address information together with an operating system (OS) master image that is read by the first virtual instance.

15. The network configuration method according to claim 13, comprising:

for an access by a client connected to the external network, via either the physical gateway or the virtual gateway, to either the virtual instance or the physical instance that is connected to the first internal network, configuring whether to access via the physical gateways or the virtual gateways on the basis of a ratio of the number of the physical instances to the number of the virtual instances that connect to the first internal network.

* * * * *